United States Patent
Leone et al.

(10) Patent No.: US 9,856,829 B2
(45) Date of Patent: Jan. 2, 2018

(54) SYSTEM AND METHODS FOR IMPROVING FUEL ECONOMY

(71) Applicant: Ford Global Technologies, LLC, Dearborn, MI (US)

(72) Inventors: Thomas G. Leone, Ypsilanti, MI (US); Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/139,110

(22) Filed: Apr. 26, 2016

(65) Prior Publication Data
US 2017/0306893 A1    Oct. 26, 2017

(51) Int. Cl.
| F02M 26/01 | (2016.01) |
| F02B 37/16 | (2006.01) |
| F02B 37/24 | (2006.01) |
| B60W 10/06 | (2006.01) |
| B60W 10/24 | (2006.01) |
| B60W 10/26 | (2006.01) |
| B60W 20/00 | (2016.01) |

(52) U.S. Cl.
CPC .......... *F02M 26/01* (2016.02); *B60W 10/06* (2013.01); *B60W 10/24* (2013.01); *B60W 10/26* (2013.01); *B60W 20/00* (2013.01); *F02B 37/16* (2013.01); *F02B 37/24* (2013.01)

(58) Field of Classification Search
None
See application file for complete search history.

(56) References Cited

U.S. PATENT DOCUMENTS

| 6,138,650 A | 10/2000 | Bailey |
| 6,519,513 B2 * | 2/2003 | Nakagawa ............... B60K 6/48 |
| | | 701/108 |

(Continued)

FOREIGN PATENT DOCUMENTS

WO    2014005127 A2    1/2014

OTHER PUBLICATIONS

Alger, Terry, et al., "Dedicated EGR: A New Concept in High Efficiency Engines," SAE Int. J. Engines, vol. 2(1), pp. 520-631, Apr. 20, 2009, 12 pages.

(Continued)

*Primary Examiner* — Nicholas Kiswanto
*Assistant Examiner* — Tamara Weber
(74) *Attorney, Agent, or Firm* — Julia Voutyras; McCoy Russell LLP

(57) ABSTRACT

Methods and systems are provided for controlling engine operation in a hybrid vehicle, where the vehicle engine comprises one or more cylinders dedicated to recirculating exhaust to the intake manifold. In one example, if an engine load decreases below a level where dedicated exhaust gas recirculation may lead to combustion stability issues, engine load may be increased above the demanded load and the excess power used to charge a system battery, or if the battery state of charge is above a threshold, the engine may be shut down and the vehicle propelled via battery power. In this way, fuel economy and combustion stability issues may be improved, NOx emissions reduced, and costs for implementation of dedicated exhaust gas recirculation decreased.

18 Claims, 8 Drawing Sheets

(56) References Cited

U.S. PATENT DOCUMENTS

| | | | |
|---|---|---|---|
| 6,543,230 B1 | 4/2003 | Schmid | |
| 7,748,481 B2 | 7/2010 | Holmes et al. | |
| 8,291,891 B2 | 10/2012 | Alger, II et al. | |
| 8,443,603 B2 | 5/2013 | Hayman et al. | |
| 8,539,768 B2 | 9/2013 | Hayman et al. | |
| 8,561,599 B2 | 10/2013 | Gringrich et al. | |
| 8,996,281 B2 | 3/2015 | Gringrich et al. | |
| 9,284,920 B2 | 3/2016 | Leone et al. | |
| 2006/0196467 A1* | 9/2006 | Kang | F02B 47/08 123/305 |
| 2009/0018751 A1* | 1/2009 | Buckland | F02B 37/007 701/103 |
| 2009/0308070 A1 | 12/2009 | Alger, II et al. | |
| 2012/0204844 A1 | 8/2012 | Gringrich et al. | |
| 2012/0204845 A1 | 8/2012 | Gringrich et al. | |
| 2012/0260894 A1 | 10/2012 | Hayman | |
| 2012/0285163 A1 | 11/2012 | Hayman et al. | |
| 2012/0298070 A1 | 11/2012 | Akinyemi et al. | |
| 2012/0323470 A1 | 12/2012 | Klingbeil et al. | |
| 2013/0092128 A1 | 4/2013 | Pirjaberi et al. | |
| 2013/0220286 A1 | 8/2013 | Gringrich et al. | |
| 2013/0226435 A1 | 8/2013 | Wasberg et al. | |
| 2013/0340727 A1 | 12/2013 | Keating | |
| 2014/0196697 A1 | 7/2014 | Burrahm | |
| 2015/0136074 A1 | 5/2015 | Styles et al. | |
| 2015/0136076 A1* | 5/2015 | Styles | F02D 17/04 123/325 |
| 2015/0175147 A1* | 6/2015 | Teraya | B60W 10/06 701/22 |
| 2015/0192078 A1 | 7/2015 | Martin et al. | |
| 2015/0322904 A1 | 11/2015 | Leone et al. | |
| 2015/0354477 A1 | 12/2015 | Leone et al. | |
| 2015/0354482 A1 | 12/2015 | Leone et al. | |
| 2016/0025021 A1 | 1/2016 | Hilditch et al. | |
| 2016/0040607 A1 | 2/2016 | Ku et al. | |
| 2016/0097405 A1* | 4/2016 | Hoshino | B60K 6/485 60/428 |
| 2016/0102636 A1 | 4/2016 | Styles et al. | |

OTHER PUBLICATIONS

"Powering the Way to Better Fuel Economy," Southwest Research Institute, http://www.swri.org/3pubs/ttoday/Summer13/powering-the-way.htm, pp. 1-3, Accessed Jul. 26, 2016, 3 pages.

Leone, Thomas G. et al., "System and Methods for Improving Fuel Economy," U.S. Appl. No. 15/139,146, filed Apr. 26, 2016, 82 pages.

\* cited by examiner

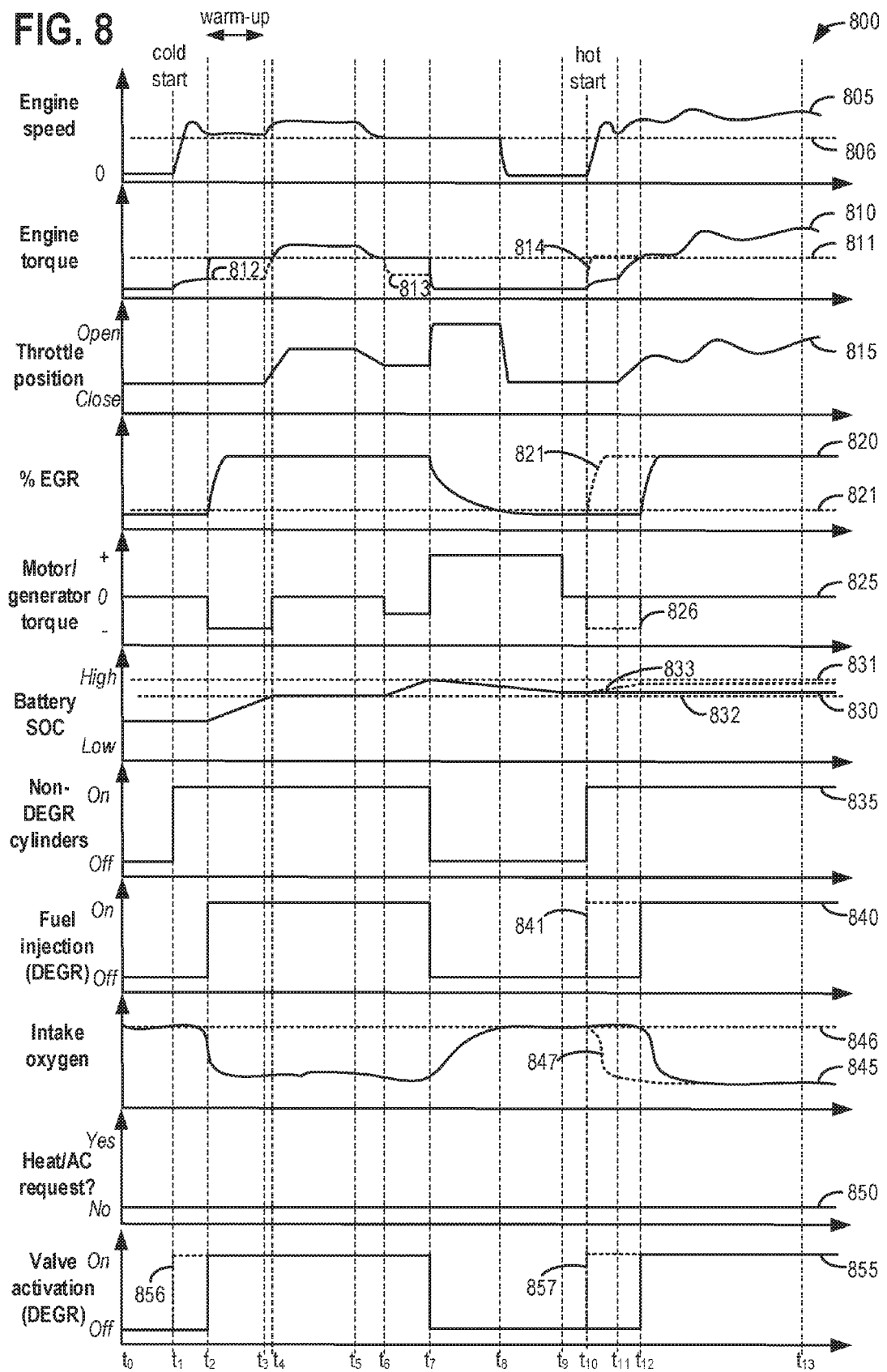

SYSTEM AND METHODS FOR IMPROVING FUEL ECONOMY

FIELD

The present description relates generally to methods and systems for controlling a vehicle engine to improve fuel economy and avoid combustion instability issues while maintaining low levels of undesired emissions at low engine loads and during engine start events.

BACKGROUND/SUMMARY

Engines may be configured with exhaust gas recirculation (EGR) systems to divert at least some exhaust gas from an engine exhaust manifold to an engine intake manifold. By providing a desired engine dilution, such systems reduce engine knock, throttling losses, in-cylinder heat losses, as well as nitrogen oxide (NOx) emissions. As a result, fuel economy is improved, at part throttle loads and at higher load levels such as during engine boost. As an example, by recirculating a portion of the engine's exhaust back to the engine cylinders, the oxygen in the incoming air stream is diluted and gases inert to combustion act as absorbents of combustion heat to reduce peak in-cylinder temperatures. Because NOx forms primarily when a mixture of nitrogen and oxygen is subjected to high temperature, the lower combustion chamber temperatures caused by EGR reduces the amount of NOx generated from combustion. Engines have also been configured with a sole cylinder (or cylinder group) that is dedicated for providing external EGR to other engine cylinders. Therein, all of the exhaust from the dedicated cylinder group is recirculated to the intake manifold. As such, this allows a substantially fixed amount of EGR to be provided to engine cylinders at most operating conditions. By adjusting the fueling of the dedicated EGR (DEGR) cylinder group (e.g., to run rich), the EGR composition can be varied to include species such as Hydrogen and CO which improve the EGR tolerance of the engine, resulting in fuel economy benefits.

When one or more cylinders are dedicated to providing EGR, under standard fueling and controls, the EGR fraction in the charge flow is simply the ratio of the number of EGR cylinders to the total number of cylinders. As an example, an engine comprising one DEGR cylinder out of a total of four cylinders will operate at 25% EGR if all cylinders are operated similarly. While such an arrangement simplifies engine operation in terms of controls, hardware devices, etc., the simplified operation results in a general lack of control over the system. For example, a key disadvantage is the inability to reduce EGR rate at light loads, where combustion stability is a constraint. Another example where lack of control may be disadvantageous is during transient conditions where the pressure of the charge flow in the intake manifold can change more rapidly than the pressure of the exhaust in the exhaust manifold of the dedicated EGR cylinder(s), such as when the driver tips out of the pedal causing the throttle to close quickly. In such an example, the EGR fraction provided may increase significantly over the expected or desired EGR fraction. Deviations from expected or desired EGR fractions may lead to undesired operating conditions, such as cylinder misfire, and combustion instability. As such, it is desirable to enable control over dedicated EGR during light loads and transient conditions, without substantially increasing costs.

US Patent Application US 2015/0369180 teaches that during conditions where an engine shutdown is imminent, requested, or initiated, fueling to the DEGR cylinder(s) may be stopped prior to deactivating the non-DEGR cylinders and shutting down the engine. Furthermore, during engine starting conditions, fuel and spark may be supplied to non-DEGR cylinders, where activation of the DEGR cylinder(s) is initiated responsive to the engine reaching a stable speed. However, the inventors herein have recognized potential issues with such a method. For example, stopping fueling to the DEGR cylinder while maintaining fueling of the non-DEGR cylinders may result in an increase in noise, vibration, and harshness (NVH) constraints under some conditions of vehicle operation due to the uneven firing intervals in the remaining non-DEGR cylinders. Further, in some examples the vehicle may be continuously operated at an engine speed or load where continued engine operation with DEGR may result in combustion stability issues, without proceeding to an engine off state. In such an example, operating the vehicle continuously with non-DEGR cylinders may negatively impact fuel economy, in addition to increasing noise, vibration, and harshness of the operating conditions. Furthermore, operating a vehicle without EGR may in some examples lead to increased NOx emissions.

US Patent Application US 2015/0136074 teaches methods for expediting purging of EGR in a hybrid vehicle during decreasing engine load conditions, where due to a large transport delay between the LP-EGR valve and the combustion chamber, EGR may not be decreased as fast as required. The delay in purging may lead to combustion stability risks. As such, if the vehicle system battery is unable to accept further charge, US 2015/0136074 teaches disabling engine fueling responsive to decreasing engine load conditions, and propelling the vehicle via battery power. The engine may be spun unfueled via the motor while maintaining open the LP-EGR valve and an intake throttle, to purge the EGR system and intake air induction system of exhaust residuals. In an alternate example, if the battery is deemed able to accept further charge, EGR purging may be enabled by operating the vehicle in a generating mode, by closing the EGR valve and operating the engine with output torque greater than demanded torque, and charging the system battery. With the EGR valve closed and the engine in operation, EGR may be quickly purged from the intake. However the inventors have recognized potential issues with such a method. For example, US2015/0136074 does not teach methods for operating a vehicle wherein one or more cylinders comprise DEGR cylinders. Additionally, US2015/0136074 does not teach methods for maintaining EGR during decreasing load conditions, where NOx emissions may increase if EGR is not able to be maintained during engine-on conditions. As such, the inventors have recognized that alternate methodology may be utilized in order to maximize fuel economy and minimize combustion stability issues, while maintaining low NOx emissions, particularly with regard to low-load events where the system battery is capable of accepting further charge.

Thus, the inventors herein have developed systems and methods to at least partially address the above issues. In one example, the issues described above may be addressed by a method including recirculating exhaust gases from one or more cylinders of an engine to the remaining cylinders without controlling the amount of the recirculated exhaust gases; controlling power output of the engine to a desired power to deliver the driver demanded power at the wheels of the vehicle; and under light loads of the engine, increasing the power beyond the desired power, and recharging an onboard energy storage device to reduce the power to the desired power while maintaining the amount of exhaust gas recirculation. In modes of operation other than responding to the driver demanded power at the wheels, for example during idle speed control, the engine power is controlled to achieve a desired engine idle speed. In another mode of operation when vehicle speed control is active, the engine power is controlled to achieve a desired vehicle speed.

In one example, the method includes stopping fuel injection to the one or more cylinders that recirculate exhaust gas to the remaining cylinders; stopping fuel injection to the remaining engine cylinders; and propelling the vehicle via energy from the onboard energy storage device, when the energy storage device is unable to accept further energy storage. Furthermore, the method comprises ceasing the vehicle propulsion from the energy storage device and resuming fueling the one or more cylinders that recirculate exhaust gas to the remaining cylinders when the charge state of the energy storage device exceeds a predetermined value. In this way, responsive to light loads of the engine, and an indication that the energy storage device is capable of accepting further energy storage, engine operation may be maintained while maintaining the amount of exhaust gas recirculation, thus mitigating potential combustion stability issues associated with continued EGR at light loads, and additionally mitigating increases in NOx emissions by maintaining EGR.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows an example timeline for operating a hybrid vehicle engine comprising one or more DEGR cylinders, according to the methods depicted in FIGS. 4-7.

DETAILED DESCRIPTION

Figure 1:
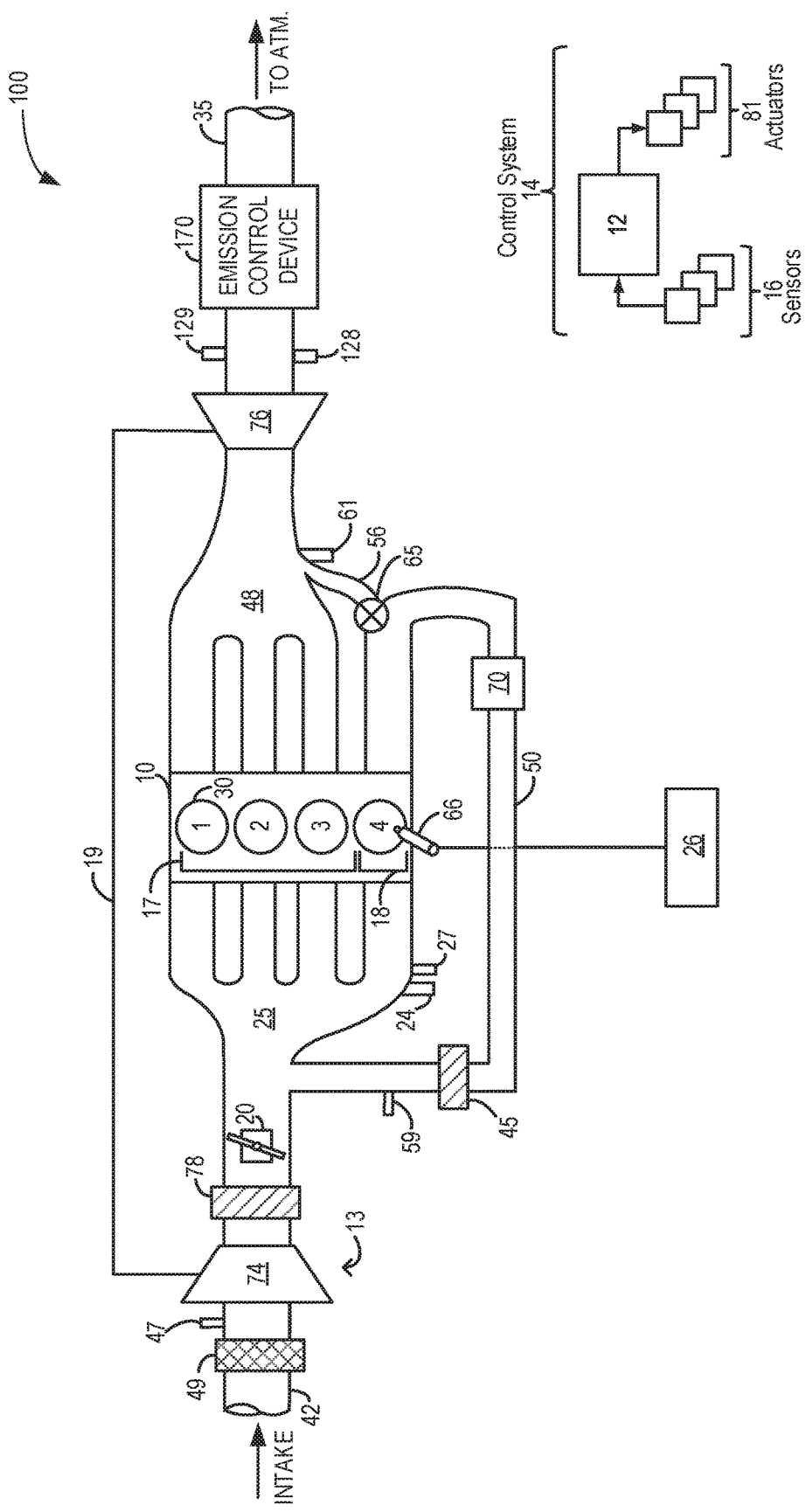
FIG. 1 shows a schematic diagram of an engine system including a DEGR donating cylinder group.
Figure 2:
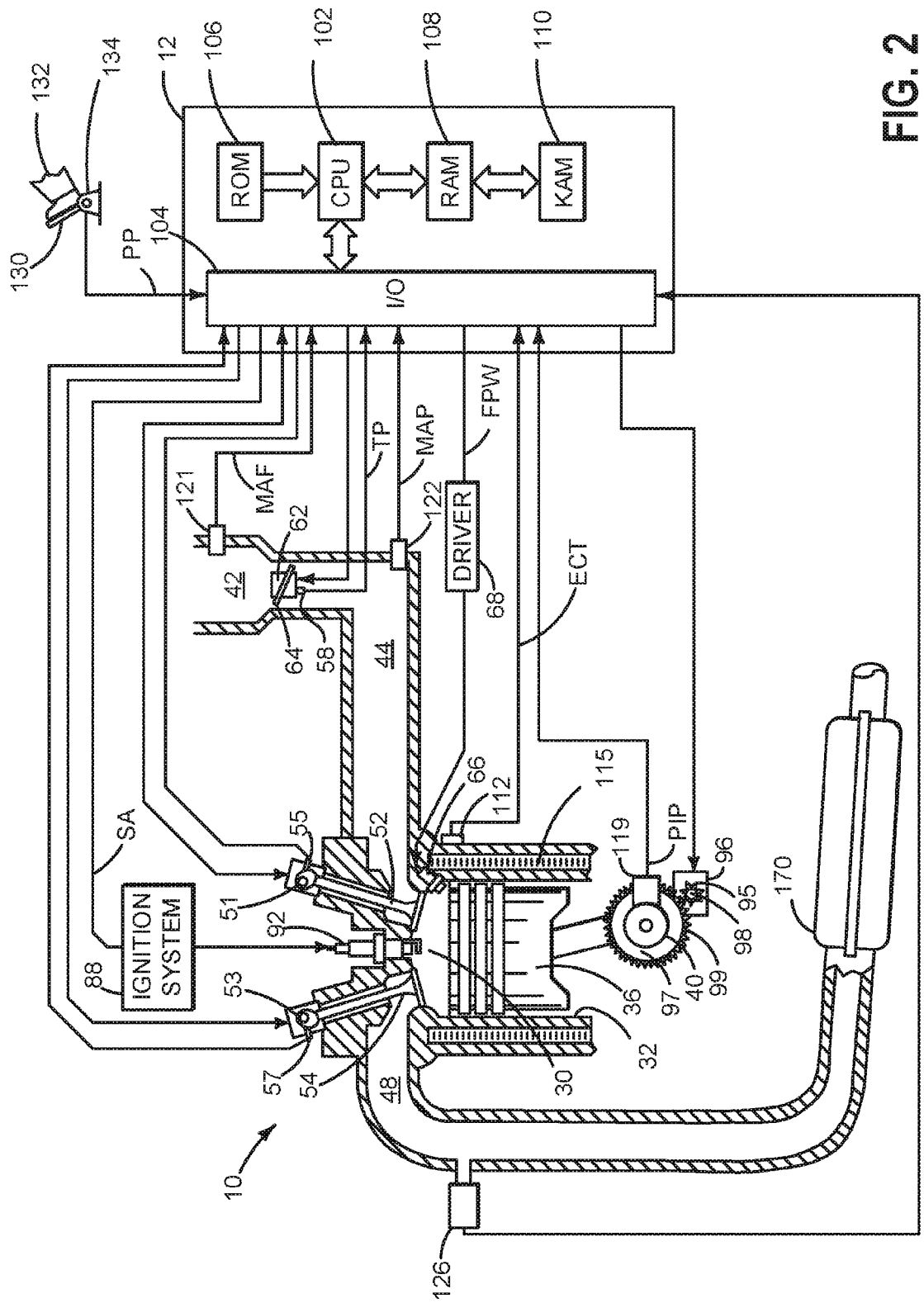
FIG. 2 shows a schematic depiction of a combustion chamber of the engine system of FIG. 1.

This detailed description relates to systems and methods for operating a hybrid vehicle engine, where the engine comprises one or more DEGR cylinders. Specifically, the description relates to controlling engine operation under conditions where engine operation with DEGR may result in combustion stability issues, and/or increases in noise, vibration, and harshness (NVH) levels. The system and methods may be applied to a vehicle engine comprising one or more non-DEGR cylinders, and one or more DEGR cylinders, such as the engine system depicted in FIG. 1. An example illustration of one of the cylinders corresponding to the vehicle engine depicted in FIG. 1, is depicted in FIG. 2. The engine comprising one or more DEGR cylinders may be configured within a hybrid propulsion system such as the hybrid propulsion system illustrated in FIG. 3. Responsive to conditions where engine operation with DEGR may result in combustion stability issues, if battery charge is above a threshold and engine operation is not required, fueling to the engine may be disabled and the vehicle may be operated in battery mode where motor torque is utilized to propel the vehicle according to the method illustrated in FIG. 4. Alternatively, the method illustrated in FIG. 4 may be used to increase engine load above a threshold such that continued operation of DEGR does not result in combustion stability issues, with the excess torque used to charge the vehicle system battery, under conditions where battery charge is lower than a threshold charge level. If the vehicle engine is stopped, the vehicle engine may be restarted, according to the method depicted in FIG. 5, and may include differentially operating the vehicle engine and hybrid motor depending on whether it is indicated that the restart event comprises a hot start, or a cold start, event. Responsive to a sudden tip-out event, the engine may be rapidly shut down, and battery power may be utilized to propel the vehicle, as illustrated by the method of FIG. 6, provided that engine operation is not required. In an example condition where combustion stability issues may result with continued operation of the engine with DEGR, yet engine operation is required, fueling to the DEGR cylinder may be deactivated and the electric motor may be used for high frequency cancellation of torque pulsations due to uneven firing interval, according to the method depicted in FIG. 7. A timeline for controlling engine operation in a hybrid vehicle, where the engine comprises one or more DEGR cylinders according to the methods depicted in FIGS. 4-7, is illustrated in FIG. 8.

FIG. 1 schematically shows aspects of an example engine system 100 including an engine 10 with four cylinders (1-4). As elaborated herein, the four cylinders are arranged as a first cylinder group 17 consisting of non-dedicated EGR cylinders 1-3, cylinders that do not recirculate (route) exhaust gas to the intake manifold but only to an exhaust passage, and a second cylinder group 18 consisting of dedicated EGR cylinder 4, that route exhaust directly from the second group to the intake manifold. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 49 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 27. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers 30 through a series of intake valves (see FIG. 2). The combustion chambers are further coupled to exhaust manifold 48 via a series of exhaust valves (see FIG. 2). In the depicted embodiment, exhaust manifold 48 includes a plurality of exhaust manifold sections to enable effluent from different combustion chambers to be directed to different locations in the engine system. In particular, effluent from the first cylinder group 17 (cylinders 1-3) is directed through turbine 76 of exhaust manifold 48 before being processed by an exhaust catalyst of emission control device 170. Exhaust from the second cylinder group 18 (cylinder 4), in comparison, is routed back to intake manifold 25 via passage 50, and exhaust catalyst 70. Alternatively, at least a portion of exhaust from the second cylinder group is directed to turbine 76 of exhaust manifold 48 via valve 65 and passage 56. By adjusting valve 65, a proportion of exhaust directed from cylinder 4 to the exhaust manifold relative to the intake manifold may be varied. In some examples, valve 65 and passage 56 may be omitted. In one example, valve 65 may be a three-way valve. In one example, valve 65 may be adjusted to allow all of the exhaust from cylinder 4 to exhaust manifold 48. In another example, valve 65 may be adjusted to allow all of the exhaust gas from cylinder 4 to intake manifold 25, while blocking any EGR flow to the exhaust manifold.

Exhaust catalyst 70 is configured as a water gas shift (WGS) catalyst. WGS catalyst 70 is configured to generate hydrogen gas from rich exhaust gas received in passage 50 from cylinder 4.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). Cylinders 1-3 are also referred to herein as a non-dedicated EGR cylinder group or non-dedicated EGR cylinders. While the current example shows the dedicated EGR cylinder group as having a single cylinder, it will be appreciated that in alternate engine configurations, the dedicated EGR cylinder group may have more engine cylinders.

EGR passage 50 may include an EGR cooler 45 for cooling EGR delivered to the engine intake. In addition, EGR passage 50 may include a first exhaust gas sensor 59 for estimating an air-fuel ratio of the exhaust recirculated from the second cylinder group to the remaining engine cylinders. A second exhaust gas sensor 61 may be positioned downstream of the exhaust manifold sections of the first cylinder group for estimating an air-fuel ratio of exhaust in the first cylinder group. Still further exhaust gas sensors may be included in the engine system of FIG. 1.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Additionally, a catalyst temperature may be adjusted in order to increase an efficiency of WGS catalyst 70. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine emissions and engine fuel economy may be improved.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 48 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO, from the exhaust flow when the exhaust flow is lean, and to reduce the trapped NO, when the exhaust flow is rich. In other examples, an exhaust after-treatment catalyst may be configured to disproportionate NO, or to selectively reduce NO, with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 27, MAF sensor 47, exhaust gas temperature and pressure sensors 128 and 129, and oxygen sensors 24, and 61. Example actuators include throttle 20, fuel injector 66, dedicated cylinder group valve 65, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIGS. 4-7.

Referring to FIG. 2, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bars. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of emission control device 170. Alternatively, a two-state exhaust gas oxygen sensor may be substituted for UEGO sensor 126. Emission control device 170 may be configured as described above with regard to FIG. 1.

Controller 12 is shown in FIG. 2 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 115; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 119 sensing crankshaft 40 position; a measurement of air mass entering the engine from sensor 121; and a measurement of throttle position from sensor 58. Barometric pressure may also be sensed (sensor not shown) for processing by controller 12. In a preferred aspect of the present description, engine position sensor 119 produces a predetermined number of equally spaced pulses for every revolution of the crankshaft, from which engine speed (RPM) can be determined.

Figure 3:
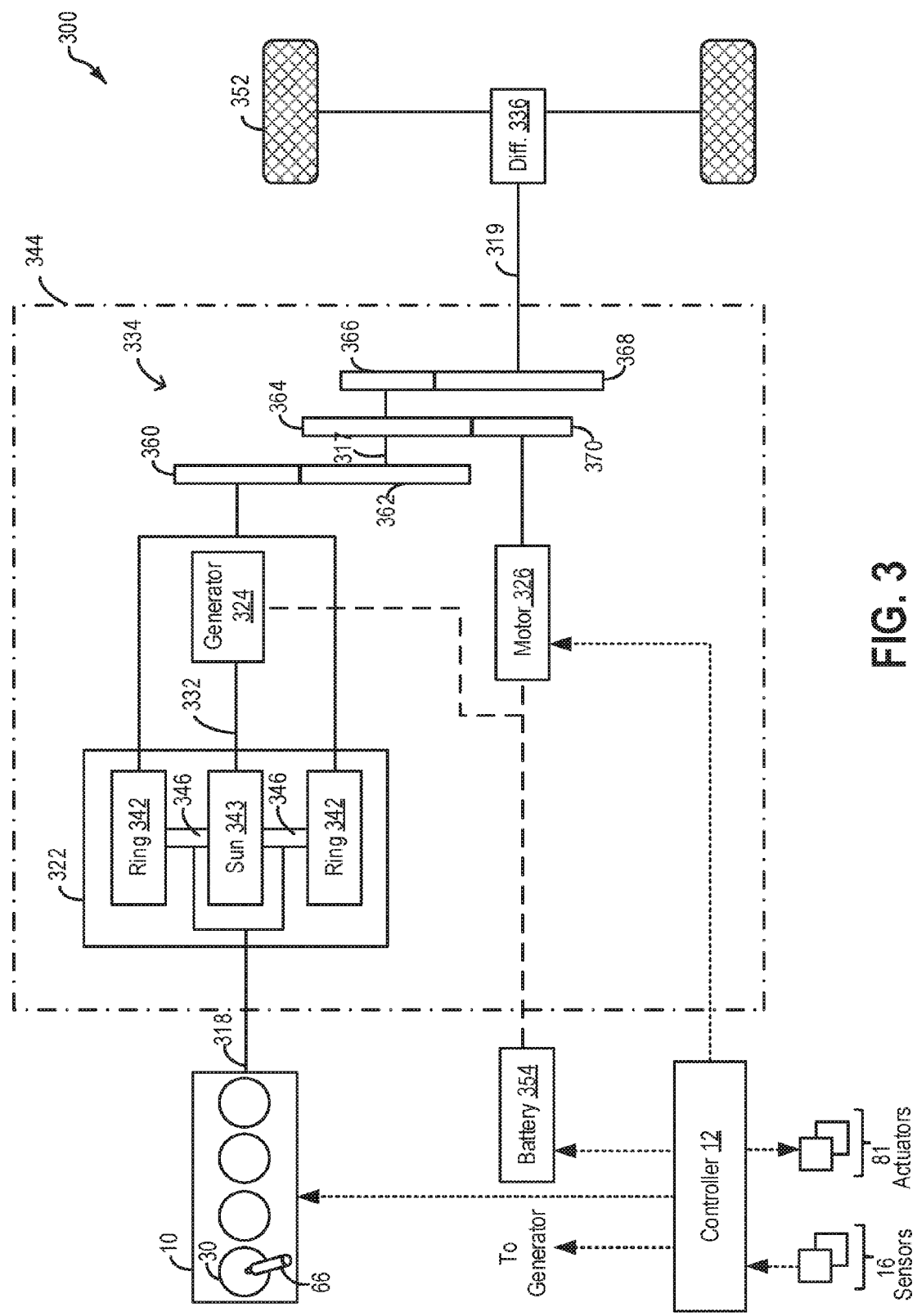
FIG. 3 shows a schematic depiction of a hybrid electric vehicle system.

In some examples, the engine may be coupled to an electric motor/battery system in a hybrid vehicle as shown in FIG. 3 or a stop/start vehicle equipped with a high voltage starter system (not shown).

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by ignition devices such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above description is merely an example, and that intake and exhaust valve opening and/or closing timings may vary, such as to provide positive or negative valve overlap, late intake valve closing, or various other examples.

FIG. 3 depicts a hybrid propulsion system 300 for a vehicle. In the depicted embodiment, the vehicle is a hybrid electric vehicle (HEV). For simplicity and clarity, the description herein will focus on controlling engine operation with one or more DEGR cylinders in a HEV, however it should be understood that the use of a HEV for this description is not meant to be limiting in any way. For example, the methods depicted herein may be applied to controlling engine operation with one or more DEGR cylinders in a flywheel hybrid, where a mechanical flywheel storage device is used instead of an electric battery, or a hydraulic hybrid, where energy is stored in a pressure accumulator instead of an electric battery, without departing from the scope of the present disclosure.

Propulsion system 300 includes an internal combustion engine 10 having a plurality of cylinders 30. Fuel may be provided to each cylinder of engine 10 from a fuel system (not shown) including one or more fuel tanks, one or more fuel pumps, and injectors 66.

Engine 10 delivers power to transmission 344 via torque input shaft 318. In the depicted example, transmission 344 is a power-split transmission (or transaxle) that includes a planetary gearset 322 and one or more rotating gear elements. Transmission 344 further includes an electric generator 324 and an electric motor 326. The electric generator 324 and the electric motor 326 may also be referred to as electric machines as each may operate as either a motor or a generator. Torque is output from transmission 344, for propelling vehicle tractions wheels 352, via a power transfer gearing 334, a torque output shaft 319, and differential-and-axle assembly 336.

Generator 324 is drivably connected to electric motor 326 such that each of electric generator 324 and electric motor 326 may be operated using electric energy from an electrical energy storage device, herein depicted as battery 354. In some embodiments, an energy conversion device, such as an inverter, may be coupled between the battery and the motor to convert the DC output of the battery into an AC output for use by motor. However, in alternate embodiments, the inverter may be configured in the electric motor.

Electric motor 326 may be operated in a regenerative mode, that is, as a generator, to absorb energy from vehicle motion and/or the engine and convert the absorbed kinetic energy to an energy form suitable for storage in battery 354. Furthermore, electric motor 326 may be operated as a motor or generator, as required, to augment or absorb torque provided by the engine.

Planetary gearset 322 comprises a ring gear 342, a sun gear 343, and a planetary carrier assembly 346. The ring gear and sun gear may be coupled to each other via the carrier. A first input side of planetary gearset 322 is coupled to engine 10 while a second input side of the planetary gearset 322 is coupled to the generator 324. An output side of the planetary gearset is coupled to vehicle traction wheels 352 via power transfer gearing 334 including one or more meshing gear elements 360-368. In one example, the meshing gear elements 360-368 may be step ratio gears wherein carrier assembly 346 may distribute torque to the step ratio gears. Gear elements 362, 364, and 366 are mounted on a countershaft 317 with gear element 364 engaging an electric motor-driven gear element 370. Electric motor 326 drives gear element 370, which acts as a torque input for the countershaft gearing. In this way, the planetary carrier 346 (and consequently the engine and generator) may be coupled to the vehicle wheels and the motor via one or more gear elements. Hybrid propulsion system 300 may be operated in various embodiments including a full hybrid system, wherein the vehicle is driven by only the engine and generator cooperatively, only the electric motor, or a combination. Alternatively, assist or mild hybrid embodiments may also be employed, wherein the engine is the primary source of torque and the electric motor selectively adds torque during specific conditions, such as during a tip-in event.

For example, the vehicle may be driven in an engine mode wherein engine 10 is operated in conjunction with the electric generator (which provides reaction torque to the planetary gearset and allows a net planetary output torque for propulsion) and used as the primary source of torque for powering wheels 352 (the generator may also be providing torque to wheels if in motoring mode). During the engine mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 343, producing a reaction torque to the engine. Consequently, torque is output by the planetary carrier to gears 362, 364, 366 on countershaft 317, which in turn delivers the power to wheels 352. Additionally, the engine can be operated to output more torque than is needed for propulsion, in which case the additional power is absorbed by the generator (in generating mode) to charge the battery 354 or supply electrical power for other vehicle loads.

In another example, the vehicle may be driven in an assist mode wherein engine 10 is operated and used as the primary source of torque for powering wheels 352 and the electric motor is used as an additional torque source to act in cooperation with, and supplement the torque provided by, engine 10. During the assist mode, as in the engine mode, fuel is supplied to engine 10 so as to spin the engine fueled and provide torque to the vehicle wheels.

In still another example, the vehicle may be driven in an engine-off or electric mode wherein battery-powered electric motor 326 is operated and used as the only source of torque for driving wheels 352. As such, during the electric mode, no fuel may be injected into engine 10 irrespective of whether the engine is spinning or not. The electric mode may be employed, for example, during braking, low speeds, low loads, while stopped at traffic lights, etc. Specifically, motor power is delivered to gear element 370, which in turn drives the gear elements on countershaft 317, and thereon drives wheels 352.

Propulsion system 300 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The various actuators may include, for example, the gear set, cylinder fuel injectors (not shown), an air intake throttle coupled to the engine intake manifold (not shown), etc. Additional sensors and actuators are elaborated in FIGS. 1-2. Controller 12 may receive input data from the various sensors, process the input data, and trigger the actuators in response to the processed input data based on instruction or code programmed therein corresponding to one or more routines. Example control routines are described herein with regard to FIG. 4-7.

Figure 4:
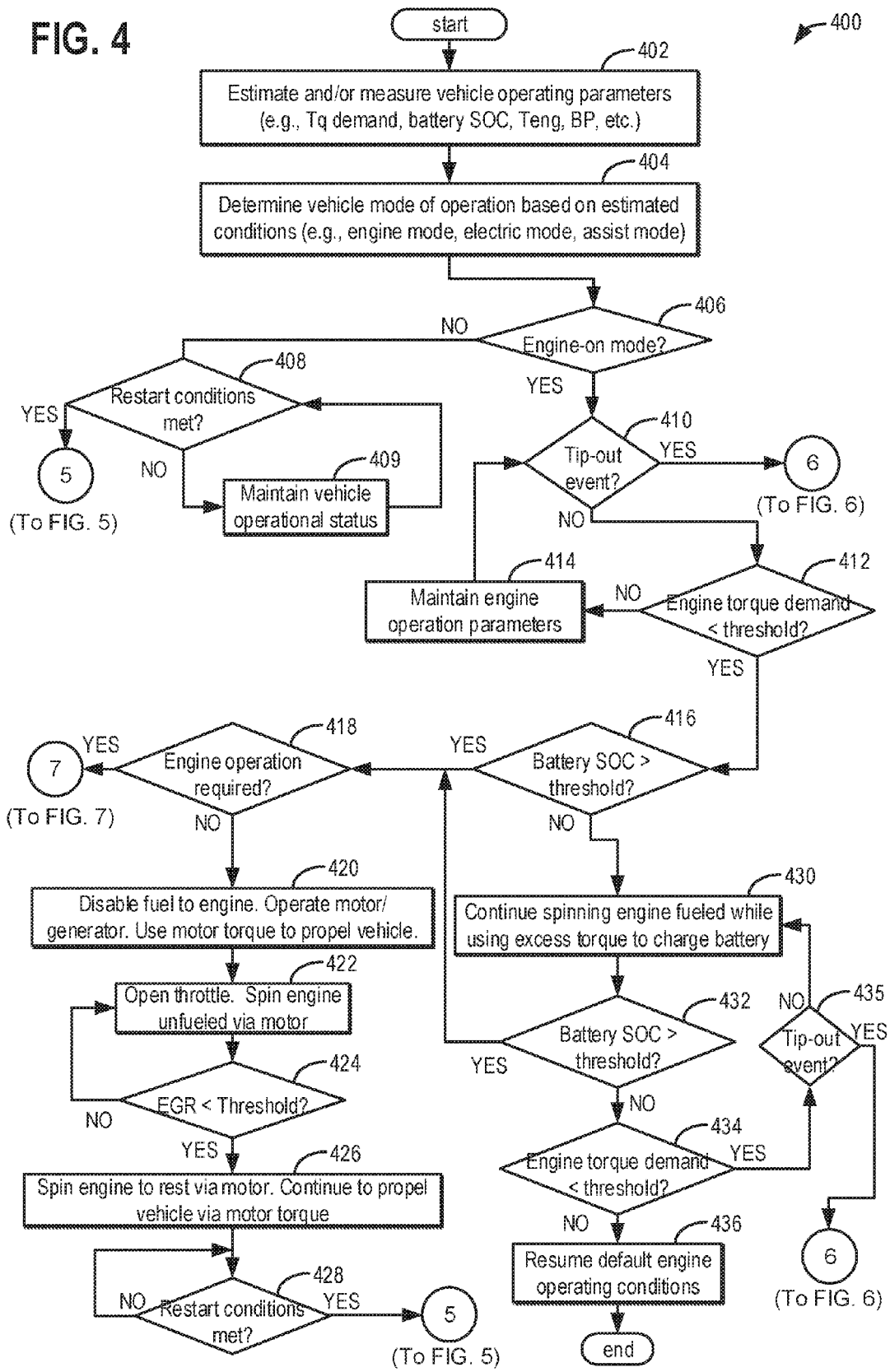
FIG. 4 shows a flowchart for a high level example method for operating a hybrid vehicle engine where the engine comprises one or more DEGR cylinders.

Turning now to FIG. 4, a flow chart for a high level example method 400 for operating a hybrid vehicle engine where the engine comprises one or more dedicated EGR (DEGR) cylinders is shown. More specifically, method 400 may be used to indicate whether a tip-out event is indicated, or if the vehicle is operating under low-load, where continued engine operation with DEGR is not desirable due to combustion stability issues. Responsive to low-load conditions where a tip-out event is not indicated, if battery state of charge is greater than a threshold and if engine operation is not required, the vehicle may be propelled via battery power while discontinuing engine operation. Alternatively, if battery state of charge is lower than a threshold, engine operation may be continued, engine load may be increased (or during a partial tipout, not decreased all the way to the load and speed required for the decreasing wheel power), and excess torque used to charge the battery. In this way, under circumstances where the unmitigated continued operation of an engine configured with one or more DEGR cylinders is not desirable, actions may be taken such that combustion stability issues may be avoided. By combining a dedicated EGR engine with a hybrid powertrain, fuel economy may thus be improved, while avoiding the problems associated with dedicated EGR at low loads. Method 400 will be described with reference to the systems described herein and shown in FIGS. 1-3, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-3. The controller may employ fuel system actuators such as fuel injectors (e.g., 66), spark plug (e.g., 92), intake throttle (e.g., 20), etc., according to the method below.

Method 400 begins at 402 and includes estimating and/or measuring engine operating conditions and vehicle operating parameters. For example, brake pedal position, accelerator pedal position, operator torque demand, battery state of charge (SOC), engine temperature (Teng), ambient temperature and humidity, barometric pressure (BP), etc., may be estimated and/or measured. In one example the hybrid vehicle system is a powersplit hybrid. However, as described above with regard to FIG. 3, in other examples the hybrid vehicle system may comprise a flywheel hybrid, or a hydraulic hybrid, without departing from the scope of the present disclosure.

Proceeding to 404, a vehicle mode of operation may be determined based on the estimated operating conditions. For example, based at least on the estimated driver torque demand and the battery SOC, it may be determined whether the vehicle is to be operated in an engine-only mode (with the engine driving the vehicle wheels), an assist mode (with the battery assisting the engine in driving the vehicle), or an electric-only mode (with only the battery driving the vehicle). In one example, if the demanded torque can be provided by only the battery, as discussed in more detail below, the vehicle may be operated in the electric-only mode. In another example, if the demanded torque cannot be provided solely by the battery, the vehicle may be operated in the engine mode, or in the assist mode. The vehicle may accordingly be operated in the determined mode of operation.

Continuing to 406, it may be confirmed whether the vehicle is in an engine-on mode. For example, it may be confirmed that the vehicle is operating in an engine-only mode where the vehicle is being propelled with engine torque only. Alternatively, it may be confirmed that the vehicle is operating in an assist mode and that the vehicle is being propelled, as least in part, with engine torque. If the engine-on mode is not confirmed, method 400 may proceed o 408. At 408, method 400 may include indicating whether engine restart conditions are met. For example, engine restart conditions may be met responsive to one or more of the battery SOC being lower than a threshold level of a charge, a request for passenger heat or air conditioning being received, operator torque demand being greater than a threshold amount, etc. If engine restart conditions are not met at 408, method 400 may proceed to 409. At 409, method 400 may include maintaining the current vehicle operational status. For example, the engine may be maintained shut down and the vehicle may be continued to be operated via battery power. In another example, if the vehicle is not in operation, for example the vehicle is in a key-off state, the engine may similarly be maintained shutdown until restart conditions are met. Alternatively, if at 408 it is indicated that restart conditions are met, method 400 may proceed to method 500 depicted in FIG. 5 where it may be determined whether the engine restart event comprises a hot start, or a cold start event, where engine operation during the restart may be adjusted as described in further detail below.

Returning to 406, if it is indicated that the vehicle is in an engine-on mode, method 400 may proceed to 410. At 410, method 400 may include indicating whether a tip-out event is indicated. A tip-out event indicates that less power or vehicle deceleration is demanded by the driver, and may be indicated by braking the vehicle, lifting off of the gas pedal, or a combination of braking and/or lifting off of the gas pedal. If a tip-out event is indicated, method 400 may proceed to method 600 depicted in FIG. 6, where an engine shutdown may be conducted in order to avoid a rapid percent increase in EGR in the intake manifold.

If, at 410, a tip-out event is not indicated, method 400 may proceed to 412. At 412, method 400 may include indicating whether engine torque demand is less than a threshold torque demand (preselected load). For example, the threshold torque demand may comprise an engine load where a dedicated amount of EGR may result in combustion stability issues. The threshold torque demand may comprise a level of torque greater than that of a tip-out event, by a predetermined amount. As such, a level of torque may be requested by a vehicle operator that is below the threshold torque demand, but greater than a tip-out event. Furthermore, transitioning to a level of torque demand below the threshold torque demand may be more gradual than the transition in torque demand that occurs responsive to a tip-out event.

If, at 412, engine torque demand is not less than the threshold torque demand, and a tip-out event was not indicated at 410, method 400 may proceed to 414. At 414, method 400 may include maintaining engine operation parameters. For example, if the vehicle is operating in an engine-only mode where the vehicle is being propelled with engine torque only, the vehicle may be maintained in such an operational status. Alternatively, if the vehicle is operating in an assist mode wherein the vehicle is operating, at least in part, by engine torque, the vehicle may be maintained in such an operational status. Furthermore, while the vehicle is operating in an engine-on mode, the vehicle may be continually monitored for whether a tip-out event is indicated, or whether an engine torque demand has dropped below the threshold torque demand.

If, at 412, engine torque demand is indicated to be below the threshold torque demand, method 400 may proceed to 416. As described briefly above, if engine torque demand drops below a threshold torque demand, continued operation of the engine with dedicated EGR may lead to combustion stability issues. As such, in a hybrid vehicle, mitigating actions may be taken to prevent issues associated with continued engine operation with dedicated EGR when engine torque demand is below a threshold torque demand. Accordingly, at 416, method 400 may include estimating and/or measuring the battery SOC (energy storage capacity), and comparing the estimated and/or measured SOC to a threshold charge level (predetermined amount). If the hybrid vehicle comprises a flywheel hybrid, or a hydraulic hybrid, at 416, method 400 may include estimating and/or measuring an energy level stored in a flywheel, or an amount of pressure accumulation, and comparing respective energy/pressure levels to their respective threshold charge levels. In the example described herein comprising a HEV, the threshold charge may be defined as a battery state of charge wherein the battery is not capable of accepting further charge. If, at 416, it is indicated that the battery SOC is greater than the threshold charge level, method 400 may proceed to 418.

At 418, it may be indicated whether engine operation is required. In some examples, engine operation may be required if a vehicle operator has requested vehicle cabin heat, or vehicle cabin air-conditioning. If engine operation is required, method 400 may proceed to method 700 depicted in FIG. 7, and may include turning off the fuel injector for the DEGR cylinder, as described in further detail therein. Alternatively, if engine operation is not indicated to be required at 418, method 400 may proceed to 420.

At 420, method 400 may include disabling fueling of the engine. Disabling engine fueling at 420 may comprise stopping fuel injection to the engine cylinders, and discontinuing spark. Furthermore, at 420, the motor/generator of the hybrid vehicle system may be operated. As such, the vehicle may be propelled using motor torque instead of engine torque, wholly by energy from the energy storage device (e.g., battery). By propelling the vehicle by using motor torque, combustion instability issues may be avoided at torque demands below the threshold torque demand. As described above, in the case of a flywheel hybrid, or a hydraulic hybrid, torque may be provided via energy stored in a flywheel, or via energy stored in a pressure accumulator, respectively, instead of via energy stored in a battery. For simplicity, further reference to flywheel and/or hydraulic hybrid technology will be avoided, instead reference will be made to hybrid electric vehicles. However, it should be understood that any example depicted below may include flywheel hybrid, or hydraulic hybrid technology without departing from the scope of this disclosure. Proceeding to 422, to expedite the purging of remaining EGR in the intake manifold, method 400 includes spinning the engine unfueled via the motor/generator. For example, the engine may be spun unfueled for an additional 1-3 seconds via the motor/generator. In addition, where air supplied to the intake manifold is regulated by an intake throttle, the intake throttle in the intake passage may be fully opened. By opening the intake throttle fully during the spinning, the dedicated EGR system and the air induction system may be purged of exhaust residuals and replenished with fresh intake air. By purging the air induction system and EGR system of exhaust residuals, combustion stability issues associated with a subsequent restart of the engine may be avoided.

Spinning the engine unfueled via the motor includes operating the generator using electrical energy from the system battery to spin the engine at a selected engine speed. The engine may be spun unfueled at a selected engine speed that is based on the engine speed before the fuel injectors are shut-off. For example, the controller may operate the generator to maintain the engine speed that the engine was spinning at immediately before the fuel injectors were disabled. As another example, the generator may spin the engine unfueled at an engine speed that is a function (e.g., fraction) of the engine speed that the engine was spinning at immediately before the fuel injectors were disabled. Alternatively, the selected engine speed may be a speed that is efficient for both the engine and the transmission. As such, the purge time required to completely purge the EGR will be a function of engine speed and throttle position.

In an alternate example, the engine may be spun unfueled at a speed based on the vehicle speed. For example, the engine speed may be set to be a calibratable speed that is stored in the controller's memory in a look-up table accessed as a function of the vehicle speed. In yet another example, the engine may be spun at a speed based on the vehicle speed and a rotational speed (or rotational speed limit) of the rotating components of the planetary gear transmission. Motor/generator settings may be adjusted to enable the engine to be spun, via motor torque, at the selected engine speed. In some embodiments, each of the generator and the motor may be operated to spin the engine at the selected engine speed. In other embodiments, only the generator may need to be operated.

In yet another example, the engine may be spun unfueled at an engine speed corresponding to at least a cranking speed of the engine. In addition to expediting EGR purging, this allows the engine to be rapidly restarted in the event of a driver change-of-mind operation (such as where the operator increases demanded engine torque shortly after the engine torque demand falls below the threshold). For example, in response to an indication of an operator change of mind, the controller may start to fuel the engine and spin up the engine from the cranking speed so as to meet operator torque demand.

In still other examples, the engine may be spun unfueled at an engine speed that allows the EGR to be purged as fast as possible. Herein, the engine speed may be selected based on the intake EGR level at a time of the decreasing engine torque demand (e.g., at a time of operator pedal tip-out). For example, the engine speed may be transiently raised to a maximum allowable engine speed that does not affect torque output but that allows EGR to be purged as fast as possible. In yet another example, the engine may be spun unfueled at an engine speed that allows the EGR to be purged at a slower rate.

In further examples, instead of spinning the engine continuously until EGR is purged, the engine may be spun unfueled via the generator intermittently. For example, during a downhill travel, the engine may be pulsed unfueled via the generator to purge the EGR.

At 424, method 400 includes indicating whether the EGR has been sufficiently purged from the engine intake manifold. For example, it may be determined if EGR (flow, amount, concentration, level, etc.) in the intake is lower than a threshold. In one example, an intake oxygen sensor, such as sensor 24 of FIG. 1, may be used to estimate the concentration of EGR in the intake. Therein, a drop in intake oxygen concentration may be used to infer an increase in EGR dilution delivery. In one example, the threshold may be based on EGR tolerance of the engine at low engine load conditions.

If the EGR is not lower than the threshold, then the controller may continue to spin the engine unfueled via the motor/generator until EGR is sufficiently purged. If EGR is lower than the threshold, then at 426, the routine includes spinning the engine to rest. For example, the engine may be spun to rest via the motor/generator and thereafter the engine may be maintained shutdown until engine restart conditions are met. In the meantime, the vehicle may continue to be propelled using motor torque. As such, this allows the EGR rate to be reset (for example, to zero) such that when the engine is restarted, combustion stability issues may not be exacerbated by residual EGR in the engine intake.

Continuing to 428, as described above with regard to step 408 of method 400, restart conditions may be met responsive to battery SOC below a threshold charge level, a heat or air conditioning request, torque demand greater than a threshold amount, etc. In one example, during propelling the vehicle via motor torque, responsive to an indication that the charge state of the battery exceeds a threshold charge level (e.g., predetermined value, or second threshold SOC), restart conditions may include ceasing the vehicle propulsion from the battery (or other energy storage device), and resuming fueling the one or more cylinders that recirculate exhaust gas to the remaining cylinders while engine load may be quickly increased above the threshold torque demand by charging the system battery according to the method depicted in FIG. 4, and further described in FIG. 8.

If engine restart conditions are not met, method 400 may include maintaining the vehicle operational status, which may include continuing to propel the vehicle via motor torque, or if at some point a vehicle off event is detected, maintaining the engine off during the vehicle off condition until engine restart conditions are met.

If restart conditions are met at 428, method 400 may proceed to method 500, depicted in FIG. 5 where it may be determined whether the engine restart event comprises a hot start, or a cold start event, where engine operation during the restart may be adjusted as described in further detail below.

Returning to 416, if battery SOC is indicated to be lower than the threshold charge level, then it may be determined that the battery is capable of accepting further charge. Consequently, at 430, method 400 may include continuing engine operation fueled with engine output torque higher than demanded torque. As such, the system battery may be charged by the engine output torque greater than demanded torque. Charging the battery may include operating the generator using the excess engine output torque, the generator coupled to the battery. For example, the engine may be operated at a level of torque and load where dedicated EGR does not result in combustion instability issues. The level of torque may be a predetermined threshold level of torque, in some examples.

Proceeding to 432, while the engine is being operated at a level of torque higher than demanded torque with excess torque used to charge the battery, battery SOC may be monitored. If, at 432, battery SOC is indicated to reach a threshold battery SOC, the threshold SOC comprising a level of charge where the battery is unable to accept further charge, method 400 may proceed to 418 and may include indicating whether engine operation is required. As described above, engine operation may be required if the vehicle operator has requested heat, or air conditioning, for example. If engine operation is required, method 400 may proceed to method 700, where fueling of the DEGR cylinder may be stopped, as described in further detail therein. If engine operation is not indicated to be required at 418, method 400 may proceed to 420, and may include disabling fueling of the engine, and propelling the vehicle using motor torque instead of engine torque. Following disabling fueling to the engine at 420, method 400 may proceed as described above. In an effort to avoid redundancy, each step of the method will not be reiterated in full detail here, but it may be understood that each step continuing from 420 may comprise all aspects of method 400 described in detail above. Briefly, propelling the vehicle using motor torque may avoid combustion instability issues at torque demands below the threshold torque level, when battery charge has increased to a level where further charging is not possible. In order to quickly purge remaining EGR in the intake manifold, the engine may be spun unfueled with the intake throttle fully open, to replenish the dedicated EGR system and air induction system with fresh intake air. Responsive to an indication that the EGR has been sufficiently purged from the engine intake manifold, the engine may be spun to rest via the motor and thereafter maintained shutdown until engine restart conditions are met. If engine restart conditions are met, method 400 may proceed to method 500, depicted in FIG. 5, where it may be determined whether the engine restart event comprises a hot start, or a cold start event, where engine operation during the restart may be adjusted as described in further detail below.

Returning to 432, if it is indicated that battery SOC has not reached a threshold SOC where the battery is unable to accept further charge during operating the engine at a torque level higher than torque demand while charging the battery, method 400 may proceed to 434. At 434, method 400 may include indicating whether engine torque demand remains less than a threshold. For example, the threshold level may comprise the threshold level described with regard to step 412 of method 400. In other words, the threshold torque demand may comprise a level of torque where dedicated EGR may result in combustion stability issues. If the engine torque demand remains below the threshold, the engine may be continued to be spun fueled at a torque level higher than torque demand while charging the battery. However, if engine torque demand remains below the threshold and a tip-out event is indicated at 435, method 400 may proceed to method 600, as described above. Alternatively, if at 434 it is indicated that engine torque demand has risen above the threshold amount, method 400 may proceed to 436. At 436, method 400 may include resuming default engine operating conditions. For example, responsive to engine torque increasing above the threshold, the engine may be operated at the torque level demand, without excess torque provided to charge the battery. Method 400 may then end.

Figure 5:
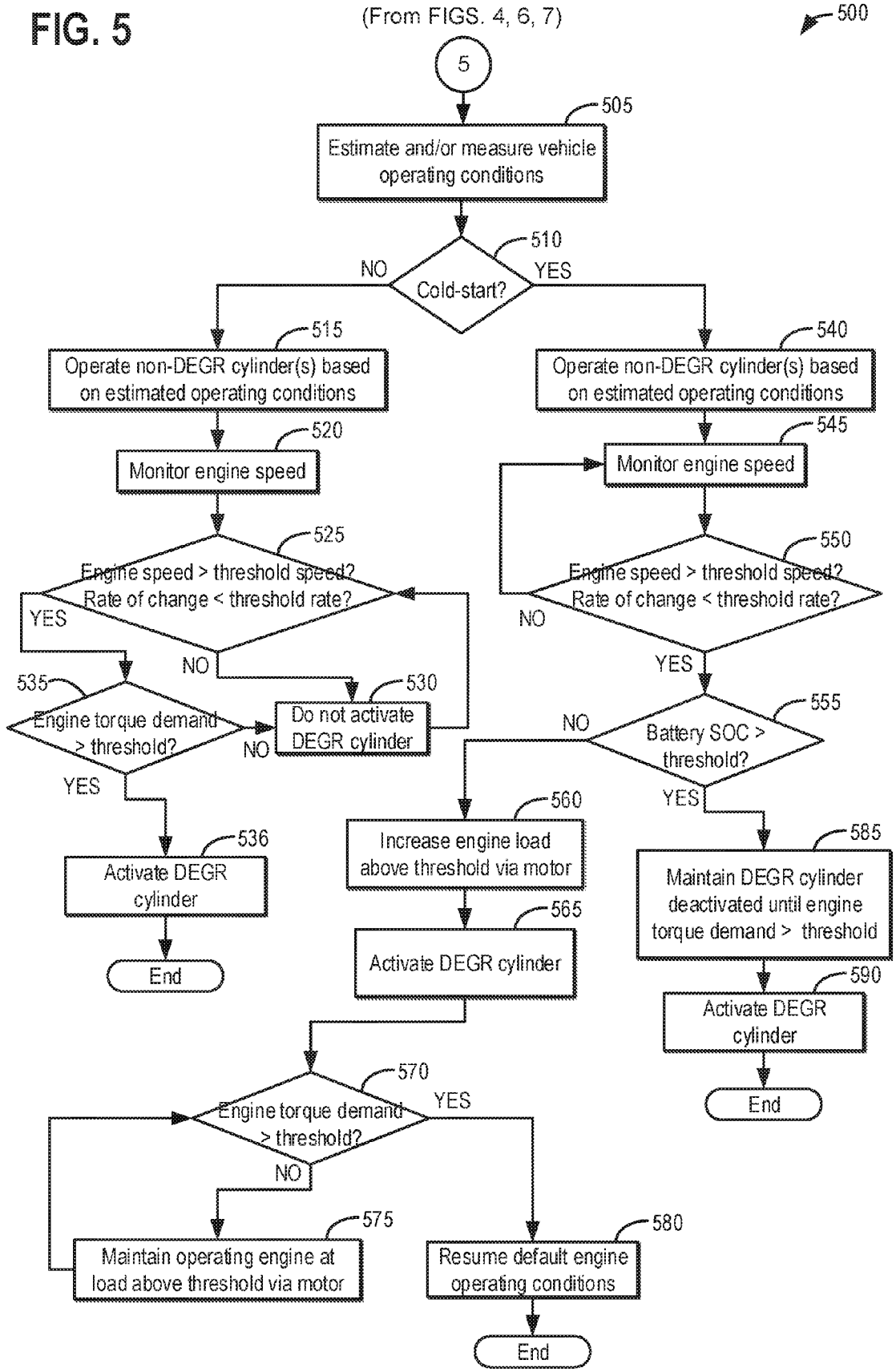
FIG. 5 shows a flowchart for a high level example method for adjusting hybrid vehicle engine operation during an engine restart event, where the engine comprises one or more DEGR cylinders.
Figure 6:
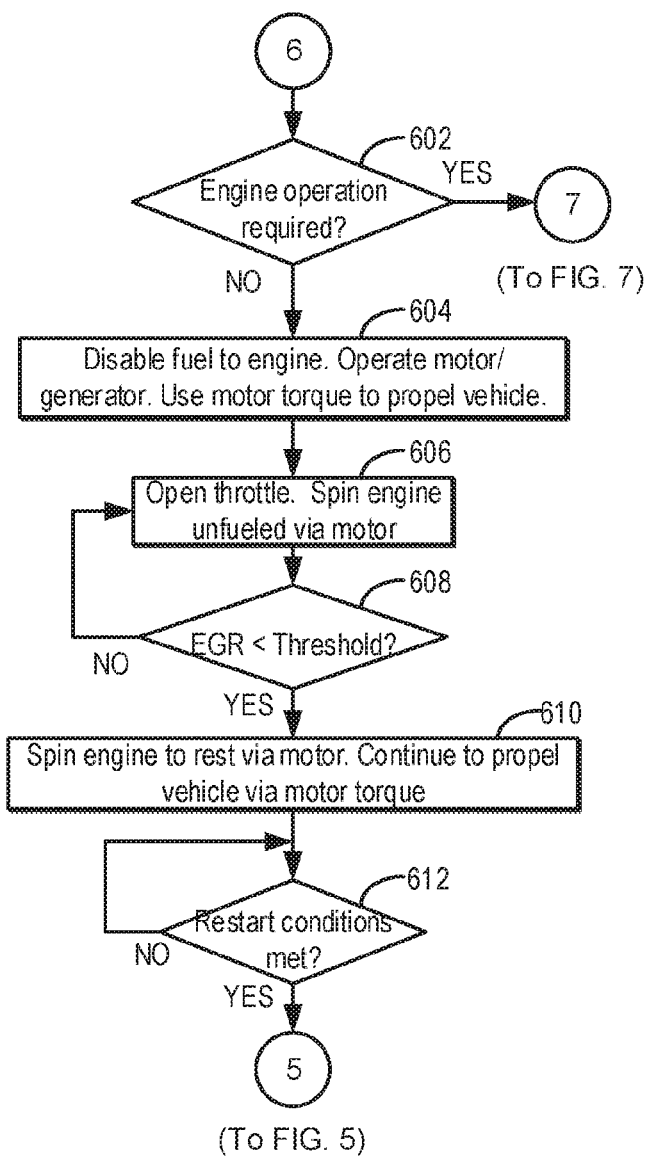
FIG. 6 shows a flowchart for a high level example method for operating a hybrid vehicle engine where the engine comprises one or more DEGR cylinders, responsive to a tip-out event.

Turning now to FIG. 5, a flow chart for a high level example method 500 for adjusting engine operation during an engine restart event, is shown. More specifically, method 500 may continue from method 400, method 600, or method 700, and includes determining whether the engine restart event comprises a hot start event, or a cold start event, and differentially regulating vehicle operating conditions depending on the type of engine restart event. For example, responsive to a hot start event, non-dedicated EGR cylinders may initially be activated, followed by activation of the one or more DEGR cylinders responsive to an indication of stable engine speed and load above defined thresholds. Alternatively, responsive to a cold-start event, non-dedicated EGR cylinders may initially be activated, followed by activation of the one or more DEGR cylinders responsive to an indication of stable engine speed above a threshold, where engine load is maintained above a threshold load limit for dedicated EGR operation by using excess torque to charge the battery during an engine warm-up period. Method 500 will be described with reference to the systems described herein and shown in FIGS. 1-3, though it should be understood that similar methods may be applied to other systems without departing from the scope of this disclosure. Method 500 may be carried out by a controller, such as controller 12 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-3. The controller may employ fuel system actuators such as fuel injectors (e.g., 66), spark plug (e.g., 92), etc., according to the method below.

Method 500 begins at 505 and includes estimating and/or measuring vehicle operating conditions. Vehicle operating conditions may include but are not limited to engine speed, accelerator position, throttle position, brake pedal position, vehicle speed, engine temperature, and load. At 510, method 500 includes indicating whether the engine restart event comprises a hot start, or a cold start event. For example, at 510, indicating an engine cold start may include engine temperature (or engine coolant temperature) being lower than a threshold temperature (such as a catalyst light-off temperature). If cold start conditions are not confirmed, then it may be determined that the engine is in a hot start condition, and method 500 may proceed to 515. More specifically, a hot start condition may comprise a determination that temperature of one or more catalyst(s) coupled to exhaust from the non-DEGR cylinders is at or above a predetermined temperature, that a time since last engine start is less than a preselected time, an indication exhaust gas temperatures are above a predetermined value, or, temperature of a coolant coupled to the engine is above a threshold value.

At 515, method 500 may include operating non-DEGR cylinders based on the estimated operating conditions and not operating DEGR cylinders. Non-DEGR cylinders may be operated by actuating the valves of the non-DEGR cylinders, and supplying fuel and spark to the non-DEGR cylinders for combustion. In some examples, during a stop-start operation of the engine, when the engine is restarted, the non-DEGR cylinders may be operated such that an engine air-to-fuel ratio is richer than stoichiometry in order to regenerate or activate an exhaust emission control device, such as emission control device 170 at FIG. 1.

Proceeding to 520, method 500 may include monitoring engine speed during a run-up period (e.g., a time from when engine speed is zero until the engine reaches a stable speed). Further, engine speed may be monitored for a predetermined amount of time after engine speed reaches stable speed during an engine start. Monitoring engine speed may include comparing actual engine speed against a desired engine speed trajectory that is stored in controller memory. Method 500 proceeds to 525 after monitoring engine speed. At 525, method 500 indicates whether or not the engine speed is greater than a threshold speed, and whether or not a rate of change of engine speed is less than a threshold change. In other words, method 500 indicates if engine speed has reached a stable speed since engine start. In some examples, a coolant temperature, an ambient temperature, and a catalyst temperature may be utilized in addition to engine speed to determine stable engine operation conditions. If at 525, it is determined that the engine speed is less than the threshold speed, and rate of change is greater than the threshold change, method 500 may proceed to 530. At 530, the method may continue engine operation with operating non-DEGR cylinders and without operating DEGR cylinders until the engine speed reaches the threshold speed and the rate of change of speed is less than threshold rate. If, at 525, it is determined that engine speed is greater than the threshold speed, and the rate of change in engine speed is less than the threshold rate of change, method 500 may proceed to 535. At 535, method 500 may include indicating whether engine torque demand is less than a threshold torque demand. For example, as described above, the threshold torque demand may comprise an engine load where a dedicated amount of EGR may result in combustion stability issues. If engine torque demand is less than a threshold torque demand, method 500 may proceed to 530 and may include continuing engine operation with operating non-DEGR cylinders and without operating DEGR cylinders, as described above. However, if at 535 it is indicated that engine torque demand is greater than the threshold torque demand, method 535 may proceed to 536, and may include activating the DEGR cylinder(s). As such, DEGR cylinders may be activated by actuating the intake/exhaust valves, and supplying fuel and spark to the cylinder for combustion. Fuel to the DEGR cylinders and the non-DEGR cylinders may be adjusted such that the engine air-to-fuel ratio is stoichiometric. In some examples, prior to activating the DEGR cylinder, method 500 may include using the electric motor for high frequency cancellation of torque pulsations resulting from the imbalance between torque produced from the combusting non-DEGR cylinders, and torque from the non-combusting DEGR cylinder. For example, the motor may be controlled to supply torque to the driveline of the vehicle to provide a substantially similar level of torque as previous and/or subsequent firing cylinders. As such, noise, vibration, and harshness may be mitigated during engine startup events.

In another example, described here and depicted in further detail in FIG. 8, responsive to a hot start event, instead of operating the non-DEGR cylinders followed by activation of the DEGR cylinder(s) responsive to an indication of stable engine speed and load above defined thresholds, an alternative methodology may be employed. In one example, responsive to a hot start event, both non-DEGR cylinders and DEGR cylinders may be activated concurrently, while engine load may be quickly increased above the threshold torque demand by charging a system battery, where the threshold torque demand may comprise an engine load where a dedicated amount of EGR may result in combustion stability issues as described above. In doing so, combustion stability issues may be avoided, and NOx emissions reduced during a hot start event. In such an example, engine load may be maintained above the threshold torque demand by charging the energy storage device until it is indicated that driver demanded torque is above the threshold torque demand, at which point the engine may be operated at the torque level demand, without excess torque provided to charge the battery, as described above with regard to FIG. 4. Furthermore, in such an example, prior to activating the non-DEGR cylinders and DEGR cylinders concurrently, it may be indicated whether battery SOC is below a threshold, such that the battery can accept further charge. If it is indicated that the battery is unable to accept further charge, then the method may proceed as depicted in FIG. 5, by operating the non-DEGR cylinders followed by activation of the DEGR cylinders, as described.

Returning to 510, if cold start conditions are confirmed, method 500 may proceed to 540. At 540, method 500 may include operating non-DEGR cylinder(s) based on the estimated operating conditions and not operating DEGR cylinders. As described above, non-DEGR cylinders may be operated by actuating the valves of the non-DEGR cylinders and supplying fuel and spark to the non-DEGR cylinders for combustion, and in some examples (e.g., start-stop operation), the non-DEGR cylinders may be operated such that engine air-to-fuel ratio is richer than stoichiometry in order to regenerate or activate an exhaust emission control device.

Proceeding to 545, method 500 may include monitoring engine speed during a run-up period, as described above, and may include comparing actual engine speed against a desired engine speed trajectory that is stored in controller memory. At 550, method 500 may include indicating whether engine speed is greater than a threshold speed, and whether or not a rate of change of engine speed is less than a threshold change. In other words, as described above, it may be determined whether engine speed has reached a stable speed. Coolant temperature, an ambient temperature, and a catalyst temperature may additionally be utilized to determine stable engine operating conditions. If a stable speed is not reached, method 500 may continue engine operation with non-DEGR cylinders and without DEGR cylinder operation until the engine speed reaches the threshold speed and the rate of change of speed is less than the threshold rate.

If it is determined that the engine speed has reached a stable speed, method 500 may proceed to 555. At 555, method 500 includes indicating whether a battery state of charge (SOC) is greater than a threshold charge level. As one example, the threshold charge level may be defined as a battery SOC wherein the battery is not capable of accepting further charge, as described above with regard to FIG. 4. If, at 555, it is indicated that the battery SOC is not greater than the threshold charge level, method 500 may proceed to 560. At 560, method 500 may include operating the engine fueled via the non-DEGR cylinders with engine output torque above a threshold, wherein the engine output torque threshold may be a predetermined threshold level of engine output torque. In one example, the level of engine output torque may comprise a level of torque where dedicated EGR does not result in combustion stability issues. Accordingly, the system battery may be charged by the engine output torque greater than demanded torque, and may include operating the generator, the generator coupled to the battery. As described above, during operating the non-DEGR cylinders, to reduce noise, vibration, and harshness, the electric motor may be used for high-frequency cancellation of torque pulsations resulting from the imbalance between torque produced from combusting non-DEGR cylinders, and non-combusting DEGR cylinders. As such, the motor may be controlled to supply torque to the driveline of the vehicle to provide a substantially similar level of torque as previous and/or subsequent firing cylinders.

Responsive to increasing engine output torque to the threshold level, method 500 may proceed to 565 where method 500 includes activating the DEGR cylinder. The DEGR cylinder may be activated by actuating the intake/exhaust valves, and supplying fuel and spark to the cylinder for combustion, and fuel to the DEGR cylinder(s) and non-DEGR cylinders may be adjusted such that the engine air-to-fuel ratio is stoichiometric. By activating the DEGR cylinder when the engine output torque is at or above the threshold level, combustion stability issues may be avoided during cold-start events.

Method 500 may continue to operate the engine with an output torque above the threshold level while charging the system battery until driver demanded engine torque reaches or exceeds the engine output torque threshold level. Accordingly, at 570, method 500 may include indicating whether the driver demanded engine torque is equal to or greater than the threshold level. If, at 570, it is indicated that driver demanded engine torque is not equal to or greater than the threshold level, method 500 may proceed to 575 where method 500 includes maintaining operating the engine with engine output torque above the threshold, with the excess torque used to charge the system battery, as described above. If, at 570, engine torque demand is equal to or greater than the threshold level, method 500 may proceed to 580. At 580, method 500 may include resuming default engine operating conditions. For example, as described above, responsive to engine torque demand increasing above the threshold level, the engine may be operated at the torque level demand, with both non-DEGR cylinders and DEGR cylinders activated, without any excess torque provided to charge the battery.

While not explicitly indicated in method 500, it may be understood that following activation of the DEGR cylinder after increasing engine torque above the threshold and charging the battery with the excess torque, if battery SOC increases above a threshold where the battery cannot accept further charge, the excess torque engine output torque may be discontinued and the DEGR valve deactivated. In such a circumstance, the engine may be continued to be operated without DEGR until driver demanded engine torque increases above a threshold where DEGR does not negatively impact combustion stability.

Accordingly, returning to 555, if it is indicated that battery SOC is above the threshold level subsequent to an indication that engine speed has reached a stable speed, method 500 may proceed to 585, and may include maintaining the DEGR cylinder deactivated and operating the engine fueled with the non-DEGR cylinders until driver demanded torque increases above the threshold where DEGR does not negatively impact combustion stability, whereupon method 500 may proceed to 590 and may include activating the DEGR cylinder and resuming default engine operating conditions.

In another example, described here and depicted in further detail in FIG. 8, responsive to a cold start event, the non-DEGR cylinders may be activated by starting fueling, providing spark, and activating the intake and exhaust valves. However, fuel to the DEGR cylinder may be shut off while the intake and exhaust valves on the DEGR cylinder may be activated. In such an example cold start condition, the catalyst material in an emission control device may not be at a sufficient temperature (e.g., light-off temperature) in order to sufficiently process exhaust emissions. As such, it may be desirable to rapidly raise the temperature of the catalyst material, thus decreasing the light-off time of one or more catalysts coupled to the non-DEGR cylinders. By activating the non-DEGR cylinders, and activating the intake and exhaust valves on the DEGR cylinder while disabling fueling to the DEGR cylinder, air may be routed to the intake of the non-DEGR cylinders, thus resulting in exhaust gases lean of stoichiometry. With exhaust gases lean of stoichiometry, excess oxygen in the exhaust gases may all be used to light-off the catalyst. Furthermore, during such an example cold-start event, ignition to the non-DEGR cylinders may be retarded, which may result in an increase in temperature of the exhaust gases traveling to the catalyst material. As such, by operating the engine lean of stoichiometry via operating the DEGR cylinder as an air pump to route air to the intake of the non-DEGR cylinders, and retarding ignition to the non-DEGR cylinders, catalyst light-off time may be decreased, which may thus reduce undesired emissions during a cold start event.

During such an example cold start event, temperature of the catalyst may be monitored, for example via a direct temperature measurement of the one or more catalyst(s), via temperature of a coolant coupled to the engine, and/or via a determination of exhaust temperature based on load of the engine, or speed of the engine. In one example, responsive to an indication that temperature of the one or more catalysts is above a predetermined threshold temperature needed for catalytic activity, and further responsive to an indication that an engine speed is greater than a threshold speed and has reached a stable speed, fueling and spark to the DEGR cylinder may be initiated. In such an example, if a driver demanded engine torque is below the engine output torque threshold level upon an indication that the catalyst is above the predetermined threshold, it may be determined whether battery state of charge (SOC) is greater than a threshold level, wherein the threshold charge level may comprise a condition where the battery in not capable of accepting further charge, as described above. If battery SOC is not greater than the threshold charge level, engine output torque may be increased above the engine output torque threshold by applying negative torque to the engine, and charging the system battery. The engine may be operated at the engine output torque threshold level by charging the system battery until it is indicated that driver demanded engine torque is equal to or greater than the engine output torque threshold. Responsive to driver demanded engine torque equaling or exceeding the engine output torque threshold, default engine operating conditions may be resumed. For example, as described above, the engine may be operated at the torque level demand, with both non-DEGR cylinders and DEGR cylinders activated, without any excess torque provided to charge the battery.

However, in a condition wherein battery SOC is greater than the threshold charge level, where temperature of the one or more catalysts is above the predetermined threshold temperature needed for catalytic activity, yet driver demanded engine torque is below the engine output torque threshold, fueling and spark to the DEGR cylinder may be maintained off, and the intake and exhaust valves on the DEGR cylinder may be deactivated. For example, deactivation of the intake and exhaust valves may include configuring the intake and exhaust valves on the DEGR cylinder both in a closed conformation. In such an example condition, closing the intake and exhaust valves may prevent air from being routed to the intake of the non-DEGR cylinders, and may thus prevent overheating of the catalyst. As such, responsive to an indication that driver demanded engine torque equals or exceeds the engine output torque threshold, default engine operating conditions may be resumed. For example, as described above, the engine may be operated at the torque level demand, with both non-DEGR cylinders and DEGR cylinders activated. Turning now to FIG. 6, a flow chart for a high level example method 600 for operating a hybrid vehicle engine in response to a tip-out event, where the engine comprises one or more dedicated EGR cylinders, is shown. More specifically, method 600 continues from method 400 and may be used to rapidly shut down the engine responsive to a tip-out event, under circumstances where engine operation is not required and independent of whether the charge state of the energy storage device is greater than, or less than, the predetermined amount. In this way, the fast rising percent EGR that occurs during tip-out events and which may result in combustion instability may be avoided. Method 600 will be described with reference to the systems described herein and shown in FIGS. 1-3, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-3. The controller may employ fuel system actuators such as fuel injectors (e.g., 66), spark plug (e.g., 92), etc., according to the method below.

Method 600 begins at 602 and includes indicating whether engine operation is required. As described above, engine operation may be required if a vehicle operator has requested passenger heat, or air conditioning. If engine operation is required, method 600 may proceed to method 700 depicted in FIG. 7, and may include turning off the fuel injector for the DEGR cylinder(s), as described in further detail therein. Alternatively, if engine operation is not indicated to be required at 602, method 600 may proceed to 604.

The rest of method 600 may proceed in similar fashion as described above with regard to steps 420-428 of method 400. To avoid redundancy, the steps will be briefly reiterated here. However, it should be understood that each step proceeding from 604 in method 600 may comprise all aspects of method 400 with regard to steps 420-428. Further, it may be emphasized that responsive to a tip-out event, method 600 may proceed directly to disabling fuel to the engine as described in further detail below, without increasing engine torque above torque demand and charging a battery, even if battery SOC is lower than a threshold, as described with regard to method 400 illustrated in FIG. 4. By proceeding directly to shutting down the engine, combustion stability issues resulting from the rapid percent increase in EGR that may occur during tip-out events may be avoided.

Accordingly, at 604, method 600 includes disabling engine fueling, which may include stopping fuel injection to the engine cylinders, and discontinuing spark. Furthermore, the motor/generator of the hybrid vehicle system may be operated such that the vehicle may be propelled using motor torque. Proceeding to 606, purging of the remaining EGR in the intake manifold may be expedited by spinning the engine unfueled via the motor generator, with an intake throttle in the intake passage fully opened. Spinning the engine unfueled may include operating the motor/generator using electrical energy from the system battery. In one example, the engine may be spun unfueled at an engine speed based on the engine speed before the fuel injectors were shut off. Another example may comprise the generator spinning the engine unfueled at a fraction of the engine speed that the engine was spinning immediately prior to disabling fuel injectors. Alternatively, the selected speed may be a speed efficient for both the engine and the transmission. Other examples may include spinning the engine unfueled at a speed that is based on the vehicle speed, or based on a combination of vehicle speed and a rotational speed of rotating components of the planetary gear transmission. Still other examples may include spinning the engine unfueled at an engine speed corresponding to a least cranking speed of the engine, to allow the engine to be rapidly restarted in the event of a driver change-of-mind operation (e.g., a tip-out followed by a tip-in shortly thereafter). For example, as described above, responsive to an indication of an operator change of mind, the controller may start to fuel the engine and spin up the engine from the cranking speed so as to meet operator torque demand. In still other examples, the engine may be spun unfueled at an engine speed that allows the EGR to be purged as fast as possible, and may be based on the intake EGR level at the time of a tip-out event. Finally, instead of spinning continuously, the engine may be spun unfueled intermittently. In each of the above described examples, motor/generator setting may be adjusted to enable the engine to be spun, at the selected engine speed. In some embodiments, each of the generator and the motor may be operated to spin the engine at the selected speed, while in other embodiments, only the generator may need to be operated.

At 608, method 600 includes indicating whether the EGR has been sufficiently purged from the engine intake manifold. As described above, whether EGR has been sufficiently purged may include indicating whether the EGR in the intake is lower than a threshold, and may be based on an intake oxygen sensor (e.g., 24).

If the EGR is not lower than the threshold, then the controller may continue to spin the engine unfueled via the motor/generator until EGR is sufficiently purged. If EGR is lower than the threshold, then at 610, the routine includes spinning the engine to rest. For example, the engine may be spun to rest via the motor and thereafter the engine may be maintained shutdown until engine restart conditions are met. In the meantime, the vehicle may continue to be propelled using motor torque. As such, this allows the EGR rate to be reset (for example, to zero) such that when the engine is restarted, combustion stability issues may not be exacerbated by residual EGR in the engine intake.

Continuing to 612, as described above, restart conditions may be met responsive to battery SOC below a threshold charge level, a heat or air conditioning request, torque demand greater than a threshold amount, etc. As described above, if during propelling the vehicle via motor torque, responsive to an indication that the charge state of the battery exceeds a threshold charge level (e.g., predetermined value, or second threshold SOC), restart conditions may include ceasing the vehicle propulsion from the battery (or other energy storage device), and resuming fueling the one or more cylinders that recirculate exhaust gas to the remaining cylinders while engine load may be quickly increased above the threshold torque demand by charging the system battery according to the method depicted in FIG. 4, and further described in FIG. 5 and FIG. 8.

If engine restart conditions are not met, method 600 may include maintaining the vehicle operational status, which may include continuing to propel the vehicle via motor torque, or if at some point a vehicle off event is detected, maintaining the engine off during the vehicle off condition until engine restart conditions are met.

If restart conditions are met at 612, method 600 may proceed to method 500, depicted in FIG. 5, where it may be determined whether the engine restart event comprises a hot start, or a cold start event, where engine operation during the restart may be adjusted as described above.

Figure 7:
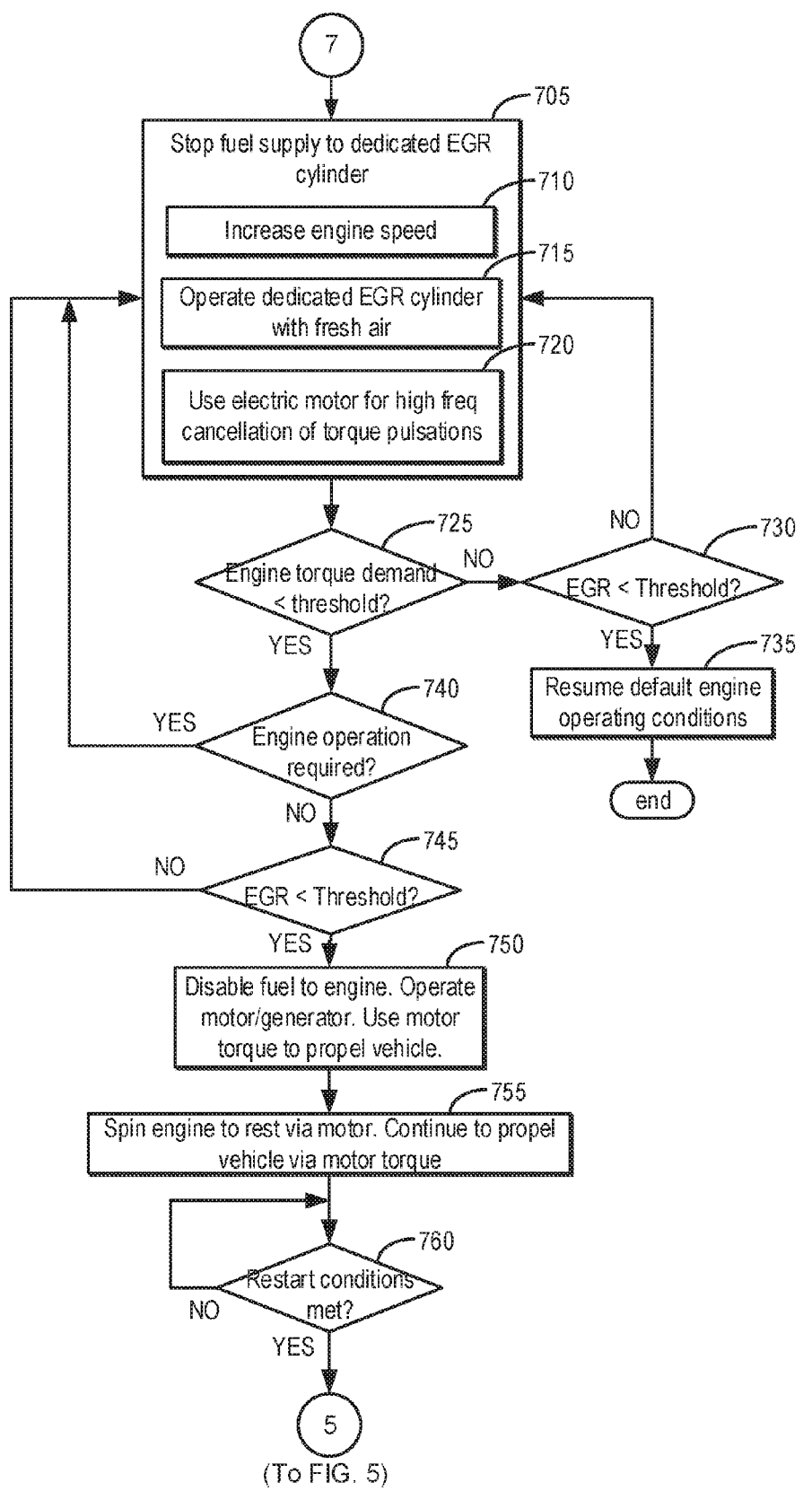
FIG. 7 shows a flowchart for a high level example method for operating a hybrid vehicle engine comprising one or more DEGR cylinders responsive to engine load below a threshold or a tip-out event, under conditions where engine operation is required.

Turning now to FIG. 7, a flow chart for a high level example method 700 for operating a hybrid vehicle where the engine comprises one or more DEGR cylinders, responsive to a tip-out event, or engine torque demand lower than a threshold, is shown. More specifically, method 700 may continue from method 400, or method 600, and may include turning off the fuel injector to the one or more DEGR cylinders responsive to a tip-out event (FIG. 6), or an engine torque demand lower than the threshold and a battery SOC greater than a threshold (FIG. 4), under circumstances where engine operation is required. In this way, if engine operation is required, for example due to a vehicle operator request for vehicle air conditioning or heat, engine operation may be maintained while fuel supply to the one or more DEGR cylinders may be disabled, thus mitigating potential combustion instability issues associated with continued operation of the one or more DEGR cylinders. Method 700 will be described with reference to the systems described herein and shown in FIGS. 1-3, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1-3. The controller may employ fuel system actuators such as fuel injectors (e.g., 66), spark plug (e.g., 92), etc., according to the method below.

Method 700 begins at 705 and includes stopping fuel supply to a DEGR cylinder(s). For example, the controller may signal a fuel injector actuator to move to a desired position in order to stop fuel supply to the DEGR cylinder. Accordingly, the fuel injector actuator may move to the desired position, and fuel supply to the DEGR cylinder may be stopped. Furthermore, spark may be disabled to the DEGR cylinder. With the DEGR cylinder deactivated, the imbalance between the torque produced in cylinders carrying out combustion, and the torque of the deactivated cylinders may result in increased engine vibration and harshness. Such vibration and harshness may be experienced by the vehicle operator and thereby reduce vehicle drive feel. To reduce noise, vibration, and harshness (NVH), engine speed may be increased at 710 via the motor/generator, and at 715 the DEGR cylinder may be operated in the absence of fuel. At 720, method 700 may include using the electric motor for high-frequency cancellation of torque pulsations resulting from the imbalance between torque produced from combusting non-DEGR cylinders and torque from non-combusting DEGR cylinders. For example, the motor may be controlled to supply torque to the driveline of the vehicle to provide a substantially similar level of torque as previous and/or subsequent firing cylinders. By operating the DEGR cylinder after stopping fuel to the DEGR cylinder, fresh air supplied to the intake through an intake throttle may be pumped through the DEGR cylinder. The fresh air in the EGR system may displace EGR in the intake manifold. As such, EGR may be purged from the intake system, resulting in a decrease in the EGR rate in the intake system and an increase in intake oxygen concentration. In this way, the remaining cylinders may be run at stoichiometry without EGR.

Proceeding to 725, method 700 may include indicating whether engine torque demand is less than a threshold torque demand. For example, as described above with regard to FIG. 4, the threshold torque demand may comprise an engine load where a dedicated amount of EGR may result in combustion stability issues. If, at 725, engine torque demand is not lower than the threshold torque demand, method 700 may proceed to 730. At 730, method 700 may include indicating whether the EGR has been sufficiently purged from the engine intake manifold. For example, as described above, it may be determined if EGR (flow, amount, concentration, level, etc.) in the intake is lower than a threshold, where the threshold may be based on EGR tolerance of the engine at low engine load conditions. In one example, an intake oxygen sensor (e.g., 24) may be used to estimate EGR in the intake. If the EGR is not lower than the threshold, method 700 may continue to operate the engine fueled with the DEGR cylinder deactivated to further purge the intake of EGR. If EGR is not lower than the threshold but engine torque demand is greater than the threshold, then in addition to using the electric motor for high frequency cancellation of torque pulsations due to the inactivation of the DEGR cylinder, additional torque may be provided via the electric motor to propel the vehicle, in an assist-mode of vehicle operation, as described above with regard to FIG. 4. Alternatively, if EGR is lower than the threshold, method 700 may proceed to 735 and may include resuming default engine operating conditions responsive to the increase in engine torque demand above the threshold. For example, resuming default engine operating conditions may comprise activating fueling to the deactivated DEGR cylinder, and resuming providing spark to the DEGR cylinder. As the torque demand is greater than the threshold, and EGR was sufficiently purged from the intake manifold during operating the engine fueled, by activating the DEGR cylinder at 735 to resume default engine operating conditions, combustion instability issues may be avoided.

Returning to 725, if it is indicated that engine torque demand remains less than the threshold, method 700 may proceed to 740. At 740, method 700 may include indicating whether engine operation is still required. In one example, engine operation may not still be required responsive to a vehicle operator discontinuing a request for engine heat or air conditioning. As such, at 740, if engine operation is still required and engine torque demand remains below the threshold, the engine may be continued to operate fueled with the DEGR cylinder deactivated, and with the electric motor providing high frequency cancellation of torque pulsations resulting from engine operation with the DEGR cylinder deactivated. Alternatively, if engine operation is not indicated to still be requested at 740, method 700 may proceed to 745. At 745, method 700 may comprise indicating whether EGR has been sufficiently purged from the engine intake manifold. As described above, in one example an intake oxygen sensor may be used to estimate EGR in the intake, and it may be indicated whether EGR in the intake is lower than a threshold. If the EGR in the intake is not lower than the threshold, the engine may be continued to be operated fueled with the DEGR cylinder deactivated to sufficiently purge the intake of EGR. Alternatively, at 745, if it is indicated that EGR in the intake is below the threshold, method 700 may proceed to 750 and may include stopping fuel injection to the non-DEGR engine cylinders, and discontinuing spark to the non-DEGR cylinders. Furthermore, at 750, method 700 may include operating the motor/generator of the hybrid vehicle system, such that the vehicle may be propelled using motor torque instead of engine torque. By propelling the vehicle by using motor torque, combustion instability issues may be avoided at torque demands below the threshold torque demand. Proceeding to 755, method 700 may include spinning the engine to rest. For example, the engine may be spun to rest via the motor and thereafter the engine may be maintained shutdown until engine restart conditions are met. In the meantime, the vehicle may continue to be propelled using motor torque.

Proceeding to 760, as described above with regard to step 408 of method 400, restart conditions may be met responsive to battery SOC below a threshold charge level, a heat or air conditioning request, torque demand greater than a threshold amount, etc. As described above, if during propelling the vehicle via motor torque, responsive to an indication that the charge state of the battery exceeds a threshold charge level (e.g., predetermined value, or second threshold SOC), restart conditions may include ceasing the vehicle propulsion from the battery (or other energy storage device), and resuming fueling the one or more cylinders that recirculate exhaust gas to the remaining cylinders while engine load may be quickly increased above the threshold torque demand by charging the system battery according to the method depicted in FIG. 4, and further described in FIG. 5 and FIG. 8.

If engine restart conditions are not met, method 700 may include maintaining the vehicle operational status, which may include continuing to propel the vehicle via motor torque, or if at some point a vehicle off event is detected, maintaining the engine off during the vehicle off condition until engine restart conditions are met.

If restart conditions are met at 760, method 700 may proceed to method 500, depicted in FIG. 5 where it may be determined whether the engine restart event comprises a hot start, or a cold start event, where engine operation during the restart may be adjusted as described above.

FIG. 8 depicts an example timeline 800 for controlling hybrid vehicle operation wherein one or more of the cylinders comprises a dedicated EGR (DEGR) cylinder using the methods described herein and with reference to FIGS. 4-7. Timeline 800 includes plot 805, indicating vehicle engine speed, over time. Line 806 represents a threshold engine speed, above which one or more DEGR cylinders may be activated during an engine hot start event, or wherein an engine load may be increased via an electric motor/generator by providing negative torque to the engine, such that one or more DEGR cylinders may be activated during an engine cold start event. Timeline 800 further includes plot 810, indicating engine torque, over time. Line 811 represents an engine output threshold torque level, below which engine operation with DEGR may result in combustion stability issues. Further, lines 812 and 813 indicate a vehicle operator demanded torque, as compared to plot 810, which indicates actual engine torque. Where a demanded engine torque is not specifically indicated, it may be understood that demanded torque and actual torque are equal. Line 814 represents an alternate example engine torque during a hot start event, as described in further detail below. Timeline 800 further includes plot 815, indicating a throttle position, over time. Timeline 800 further includes plot 820, indicating a percent EGR in the intake manifold of the vehicle engine, over time. Line 821 represents a threshold percent EGR, below which it may be indicated that EGR is sufficiently purged from the intake manifold such that future engine restarts may be initiated without residual EGR in the engine intake. Line 821 represents an alternate example percent EGR during a hot start event, as described in further detail below. Timeline 800 further includes plot 825, indicating motor/generator torque, over time. For simplicity, a negative motor/generator torque indicates the charging of the vehicle system battery, where a positive motor/generator torque indicates torque that may be used to propel the vehicle via the vehicle drivetrain. Line 826 represents an alternate example motor/generator torque during a hot start event, as described in further detail below. Timeline 800 further includes plot 830, indicating a vehicle battery state of charge (SOC), over time. Line 831 represents a threshold SOC and may include a level of charge where the battery is not capable of accepting further charge. Line 832 represents a second threshold SOC wherein, during propelling a vehicle via motor torque responsive to engine torque demand below the engine output threshold torque level, if the SOC reaches the second threshold, the engine may be activated and engine load may be quickly increased above the threshold torque demand by charging the system battery according to the method depicted in FIG. 4 Line 833 represents an alternative example battery SOC during a hot start event, as described in further detail below. Timeline 800 further includes plot 835, indicating the on or off state of non-DEGR cylinders in the vehicle over time, where the on state comprises a condition where the non-DEGR cylinders are supplied with fuel from one or more fuel injectors, and spark is provided to initiate combustion. Timeline 800 further includes plot 840, indicating whether fuel injection (and spark) is provided to one or more dedicated EGR cylinders, over time. Line 841 represents an alternative example where fuel injection (and spark) are provided to one or more dedicated EGR cylinders during a hot start event, as described in further detail below. Timeline 800 further includes plot 845, indicating a level of oxygen in the intake manifold of the vehicle engine, over time. Line 846 represents a level of oxygen where it may be indicated that EGR is sufficiently purged from the intake manifold. Line 847 represents an alternative example of a level of oxygen during a hot start event, as described in further detail below. Timeline 800 further includes plot 850, indicating whether a request for vehicle cabin heat, or air conditioning, is requested, over time. Timeline 800 further includes plot 855, indicating whether intake and exhaust valves are activated on the one or more dedicated EGR cylinders, over time. For example, if valve activation is "off", it may be understood that the intake and exhaust valves are configured in a closed conformation. Line 856 represents an alternative example where the intake and exhaust valves may be activated during a cold start event. Line 857 represents an alternative example wherein the intake and exhaust valves may be activated responsive to a hot start event.

At time $t_0$, it may be understood that the vehicle is not in operation. In other words, time $t_0$ may represent a key-off event. Engine speed is zero (e.g. mph), indicated by plot 805, and the vehicle is not being propelled by battery power, indicated by plot 825. Accordingly, torque is not provided via the engine, indicated by plot 810. As the engine is not in operation, the percentage of EGR, indicated by plot 820, is below a threshold, represented by line 821, indicating that EGR is purged from the engine intake. Accordingly, intake oxygen, as monitored by an intake oxygen sensor (e.g., 24), is at a threshold level, represented by line 846, where the threshold indicates a level of EGR below a defined percent. Both non-DEGR, and DEGR cylinders are off, represented by plots 835, and 840, respectively. Battery SOC, indicated by plot 830, is below a threshold, represented by line 831, indicating that the battery may accept further charge. Throttle position is near a closed position, indicative of the throttle position at the vehicle off event, indicated by plot 815. Furthermore, heat and/or air conditioning is not requested, indicated by plot 850.

At time $t_1$, a cold-start event is initiated. A cold-start event may comprise an indication of an engine temperature (or engine coolant temperature) below a threshold temperature (e.g., a catalyst light-off temperature). Accordingly, non-DEGR cylinders may be operated by actuating the valves of the non-DEGR cylinders, and by supplying fuel and spark to the non-DEGR cylinders for combustion. As such, engine speed and torque increase. Further, at time $t_1$, fueling and spark to the DEGR cylinder(s) are maintained off. However, in some examples, indicated by line 856, the intake and exhaust valves may be activated on the DEGR cylinder(s) in order to route air to the non-DEGR cylinders such that exhaust gases from the non-DEGR cylinders are lean of stoichiometry. In such an example, ignition timing to the non-DEGR cylinders may additionally be retarded, to increase exhaust gas heat. By activating the DEGR intake and exhaust valves in the absence of fueling the DEGR cylinder(s), in addition to retarding ignition, an exhaust catalyst may be more rapidly heated, as described above with regard to FIG. 5. As described above, in some examples, prior to activating the DEGR cylinder, the electric motor may be used for high frequency cancellation of torque pulsations resulting from the imbalance between torque produced from the combusting non-DEGR cylinders, and torque from the non-combusting DEGR cylinder. For example, the motor may be controlled to supply torque to the driveline of the vehicle to provide a substantially similar level of torque as previous and/or subsequent firing cylinders. As such, noise, vibration, and harshness may be mitigated during engine startup events.

Between time $t_1$ and $t_2$, engine speed rises above the threshold level, and engine torque increases accordingly. By time $t_2$, engine speed is indicated to be stabilized above the threshold. However, engine torque remains at a level where combustion stability issues may result responsive to operation of the engine with DEGR cylinder(s). In order to rapidly enable the engine to operate with DEGR cylinders on, at time $t_2$, negative torque may be applied to the engine, indicated by plot 825, and fuel injection to the DEGR cylinder(s) may be initiated. In some examples, initiating fuel injection to the DEGR cylinder(s) may comprise initiating fuel injection to the DEGR cylinder last in the cylinder firing order, responsive to an indication that fuel injection to the DEGR cylinder may be initiated. In other words, responsive to applying a negative torque to the engine to increase actual engine torque, fuel injection to the DEGR cylinder may be scheduled such that the DEGR cylinder is activated last in the cylinder firing order. By applying negative torque to the engine, the engine may be operated with engine output torque at or above the engine output torque threshold represented by line 811, where the threshold may represent a level of engine output torque where dedicated EGR does not result in combustion stability issues. Accordingly, between time $t_2$ and $t_3$, actual engine output torque, represented by plot 810 is at the engine output threshold, whereas in the absence of the negative torque applied to the engine via the motor/generator, engine output torque would remain below the engine output threshold, indicated by line 812. It may be understood that the duration comprising time $t_2$ to $t_3$, may comprise a "warm-up" duration. In order to show sufficient detail of the warm-up duration, the period between time $t_2$ and $t_3$ is shown as illustrated in FIG. 8, although it may be understood that the duration may not be drawn to scale, and the warm-up duration may comprise a shorter, or longer period. As the DEGR cylinder is activated, the percent EGR rises to a defined level, where the defined level may comprise a percent EGR based on the ratio of non- DEGR cylinders to DEGR cylinders. For example, in a four cylinder engine, if one of the cylinders comprises a DEGR cylinder, then the EGR would be twenty-five percent in the intake manifold, if all cylinders are operated equally. Additionally, with negative torque applied to the engine, the system battery SOC increases, as the engine output torque greater than demanded torque is used to charge the system battery. In some examples, charging the system battery may include operating a vehicle generator, the generator coupled to the system battery. Furthermore, as DEGR is activated at time $t_2$, between time $t_2$ and $t_3$, oxygen levels in the engine intake are indicated to decline, indicated by plot 845, as the oxygen is displaced by exhaust gas.

At time $t_3$, the vehicle begins accelerating. As such, throttle position is indicated to open, as the gas pedal is depressed. Accordingly, demanded engine torque is indicated to increase, indicated by plot 812. However, between time $t_3$ and $t_4$, while demanded torque remains below the engine output threshold torque level, negative torque is maintained applied to the engine such that actual engine output torque remains at the threshold and the excess torque is continued to be used to charge the system battery.

At time $t_4$, demanded engine output torque reaches the engine output torque threshold level. Accordingly, negative torque to the engine is stopped, and the battery charging operation is similarly stopped. Between time $t_4$ and $t_5$, the throttle is further opened, as the gas pedal is depressed to a defined amount. As such, engine torque and engine speed both are indicated to rise and plateau. Both non-DEGR cylinders and DEGR cylinder(s) remain activated, and both the percent EGR and oxygen level in engine intake remain stable.

At time $t_5$, throttle position is indicated to begin closing, a function of the gas pedal being released slightly from its depressed state. Accordingly, between time $t_5$ and $t_6$, as the throttle closes, engine speed and the level of engine torque demand declines. At time $t_6$, the level of engine output torque demand crosses the threshold, and as such, continued operation of the DEGR cylinder(s) may result in combustion stability issues. Thus, at time $t_6$, negative torque is applied to the engine via the motor, to maintain actual engine output torque above the engine output torque threshold level, although demanded torque as inferred by driver pedal, represented by line 813, continues to decline below the threshold. The amount of negative torque applied to the engine may be just enough to raise the level of engine output torque to the threshold level, in some examples, as depicted herein. In other examples, the amount of negative torque applied to the engine may comprise a greater amount, and may in some cases be based on a level of battery charge. For example, responsive to a battery charge below a threshold, negative torque may be increased such that additional charging of the battery may be conducted. As such, between time $t_6$ and $t_7$, although demanded torque is below the engine output torque threshold, by applying negative torque to the engine the actual engine output torque may be maintained at the threshold level, such that the DEGR cylinder(s) may be maintained activated without combustion stability issues. Accordingly, excess torque is continued to be used to charge the system battery.

At time $t_7$, battery SOC reaches a level where the battery may not accept further charge, represented by line 831. However, engine torque demand remains below the engine output torque threshold. As the battery SOC has reached the threshold, engine torque may not be maintained at or above the engine output threshold level by continued charging of the system battery. As such, it may be determined whether engine operation is required. As a request for heat or air conditioning is not indicated, represented by plot 850, engine operation is not indicated to be required. If engine operation were required, fuel to the DEGR cylinder may be stopped, and the vehicle operated with combusting non-DEGR cylinders, where the motor may be controlled for high frequency cancellation of torque pulsations resulting from the imbalance between torque produced from the combusting non-DEGR cylinders, and torque from the non-combusting DEGR cylinder, as described in detail with regard to method 700. As engine operation is not indicated to be required, at time $t_7$, the engine is shut down, which includes deactivating fuel injection and spark to both non-DEGR cylinders and DEGR cylinder(s). Furthermore, the motor may be activated to propel the vehicle via battery power, by providing positive torque to the wheels via the vehicle drivetrain.

Between time $t_7$ and $t_8$, while the motor may be used to propel the vehicle, the motor/generator may additionally be used to spin the engine unfueled and without spark (both DEGR and non-DEGR cylinders), with the intake and exhaust valves maintained activated. As such, EGR may be turned into air, enabling the rapid purging of EGR from engine intake. Additionally, the intake throttle may be commanded open, indicated by plot 815. By opening the intake throttle fully during the spinning, the dedicated EGR system and the air induction system may be purged of exhaust residuals and replenished with fresh intake air. As such, between time $t_7$ and $t_8$, percent EGR is indicated to decline, while intake oxygen is indicated to rise. As the motor is propelling the vehicle, and the engine is being spun unfueled, via battery power, between time $t_7$ and $t_8$ battery SOC decreases.

At time $t_8$, oxygen level in the engine intake is indicated to reach a threshold level represented by line 846, and as such, percent EGR in the engine intake may be indicated to similarly reach a threshold level, indicated by line 821. As such, it may be indicated at time $t_8$ that the engine intake is sufficiently purged of EGR. By purging the air intake and EGR system of exhaust residuals, combustion stability issues associated with a subsequent restart of the engine may be reduced or avoided. With the intake and EGR system purged of exhaust residuals, spinning the engine unfueled may be discontinued. Accordingly, between time $t_8$ and $t_9$, the engine may be spun to rest, and the throttle may be commanded to a default position. The vehicle may be continued to be propelled by the motor via battery power. As such, battery SOC may continue to decrease. However, as the battery SOC is not indicated to reach the second threshold SOC, represented by line 832, the vehicle is continued to be propelled via motor torque rather than activating the engine and quickly increasing engine load above the threshold torque demand by charging the system battery to mitigate combustion instability.

At time $t_9$, the vehicle is indicated to come to a stop, indicated by motor torque stopping propelling the vehicle. In some examples, the stop may indicate a refueling event. In other examples, the vehicle may be stopped at a traffic light, stop sign, etc. In this example, it may additionally be understood that the vehicle may comprise a start-stop system, where the vehicle engine may be restarted responsive to a request for acceleration. For example, a request for acceleration may include a vehicle operator releasing a brake pedal, or by initiating depressing of a gas pedal. Other examples for initiating an engine restart responsive to a request for acceleration may include any examples commonly known in the art. As such, at time $t_{10}$, a hot-start event may be initiated, as the engine was recently shut down and thus it may be understood that engine temperature and/or engine coolant temperature may remain above a threshold level.

Between time $t_{10}$ and $t_{13}$, two examples for controlling vehicle operation responsive to a hot start event. One example is represented by solid lines, and an alternative second example is represented by dashed lines as described in further detail below. In the case where there is only solid lines, solid lines represent both examples. For simplicity of the description, the first example will initially be described in full detail, and subsequently the second example will be described.

In the first example, at time $t_{10}$, non-DEGR cylinders are activated, indicated by plot 835, and DEGR cylinder(s) remain off. Between time $t_{10}$ and $t_{11}$, engine speed rises above the threshold level, and engine torque increases accordingly. By time $t_{11}$, engine speed is indicated to be stabilized above the threshold. As the engine startup event comprises a hot start event, a warm-up phase is not initiated. At time $t_{11}$, throttle position is indicated to open, the result of the gas pedal being depressed. Engine speed and torque increase as the vehicle is propelled forward by the engine. During the period where non-DEGR cylinders are combusting and DEGR cylinders are non-combusting, the motor/generator may be used for high frequency cancellation of torque pulsations resulting from the imbalance between torque produced from non-DEGR cylinders, and DEGR cylinder(s), as described above. At time $t_{12}$, engine torque rises to the threshold level where dedicated EGR is not an issue for combustion stability, and with engine speed above the threshold level, fuel injection to the DEGR cylinder(s) is initiated. Accordingly, between time $t_{12}$ and $t_{13}$, percent EGR in the engine intake rises and stabilizes, while intake oxygen in the engine intake declines and similarly stabilizes. As the vehicle is propelled via the engine, battery SOC does not change, and no torque is provided by the motor. Engine speed and engine torque fluctuate based on driver demand, as a function of throttle position.

Returning to time $t_{10}$), in an alternative second example, the non-DEGR cylinders may be activated, and the DEGR cylinder(s) may concurrently be activated, indicated by dashed line 841. In a case where fueling (and spark) to the DEGR cylinder(s) commences at time $t_{10}$, the intake and exhaust valves on the DEGR cylinder may additionally be activated, indicated by dashed line 857. In such an alternate example, negative torque may be applied to the engine, indicated by dashed line 826, to quickly increase actual engine torque to the engine output threshold torque, indicated by dashed line 814. Percent EGR begins to rise at time $t_{10}$, indicated by dashed line 821, the excess engine torque is applied to the battery, indicated by dashed line 833, and oxygen in the intake manifold begins to decline, indicated by dashed line 847.

Between time $t_{10}$ and $t_{12}$, percent EGR rises and stabilizes, oxygen levels in the intake manifold decline and stabilize, and battery SOC increases. At time $t_{12}$, engine torque demand reaches the threshold level where dedicated EGR is not an issue for combustion stability, and accordingly the engine may be operated at the torque level demand, without excess torque provided to charge the battery. Accordingly, between time $t_{12}$ and $t_{13}$, the vehicle is propelled via the engine, battery SOC does not change, and no torque is provided by the motor. Engine speed and engine torque fluctuate based on driver demand, as a function of throttle position.

In this way, responsive to light engine loads where a key disadvantage of the use of dedicated EGR includes combustion stability issues, said combustion stability issues may be mitigated by the systems and methods described herein, thus enabling continued use of EGR under light engine loads. Importantly, the continued use of EGR may reduce NOx emissions during engine operation at light loads. For example, increasing vehicle engine power output and using excess torque to charge an onboard energy storage device enables EGR to be maintained from one or more dedicated EGR cylinders, while avoiding combustion stability issues and keeping NOx levels low.

The technical effect is to maintain engine operation at a level where dedicated EGR does not result in combustion stability issues, even during continued operation at light engine loads. Such an effect is realized via combining the use of dedicated EGR cylinder(s) with a vehicle capable of storing and using energy in an onboard energy storage device. Such a vehicle is not limited to a hybrid electric vehicle, but may include any vehicle capable of capturing and utilizing energy in an onboard storage device. Some examples of energy storage devices other than batteries may include a mechanical flywheel storage device, or a hydraulic pressure accumulator. By combining the use of dedicated EGR with a vehicle capable of storing and using energy in an onboard storage device, fuel economy benefits of the use of dedicated EGR may be realized using low cost hardware while reducing NOx emissions.

The systems described herein and with reference to FIGS. 1-3, along with the methods described herein and with reference to FIGS. 4-7, may enable one or more systems and one or more methods. In one example, a method comprises recirculating exhaust gases from one or more cylinders of an engine to remaining cylinders without controlling the amount of the recirculated exhaust gases; controlling power output of the engine to a desired power; and under light loads of the engine, increasing the power beyond the desired power, and recharging an onboard energy storage device to reduce the power to the desired power while maintaining the amount of recirculated exhaust gases. In a first example of the method, the method further includes wherein the desired power comprises a desired wheel power or a desired engine idle speed; and wherein the onboard energy storage device comprises one or more of a battery, a mechanical flywheel storage device, or a hydraulic pressure accumulator. A second example of the method optionally includes the first example and further includes wherein light loads of the engine comprise a torque demand below an engine output torque threshold where recirculating exhaust gases from one or more cylinders of the engine to the remaining cylinders without controlling the amount of the recirculated exhaust gases results in combustion instability; wherein the engine output torque threshold is greater than a tip-out event torque level by a predetermined amount; wherein light loads further comprise torque demand lower than the engine output torque threshold, but greater than the tip-out event torque level; and where a tip-out event includes one or more of braking of a vehicle, lifting off of a gas pedal of the vehicle, or a combination of braking and lifting off of the gas pedal. A third example of the method optionally includes any one or more or each of the first and second examples and further comprises responsive to light loads of the engine and an energy storage capacity of the energy storage device greater than a predetermined amount, or responsive to a tip-out event: stopping fuel injection to the one or more engine cylinders that recirculate exhaust gas to an intake manifold of the engine and the remaining cylinders, and stopping fuel injection to the remaining cylinders; and propelling the vehicle via energy from the energy storage device; wherein the energy storage capacity of the energy storage device greater than the predetermined amount comprises a level of storage capacity where the energy storage device is unable to accept further energy storage. A fourth example of the method optionally includes any one or more or each of the first through third examples and further includes wherein stopping fuel injection to the one or more engine cylinders that recirculate exhaust gas to the intake manifold and the remaining engine cylinders, and stopping fuel injection to the remaining engine cylinders further comprises: operating the energy storage device to spin the engine unfueled to purge the intake manifold of residual exhaust and replenish the intake manifold with fresh intake air; where air supplied to the intake manifold is regulated by an intake throttle, and wherein the intake throttle is commanded open during spinning the engine unfueled; and responsive to an indication that residual exhaust in the intake manifold is below a threshold level: spinning the engine to rest via the onboard energy storage device. A fifth example of the method optionally includes any one or more or each of the first through fourth examples and further includes wherein stopping fuel injection to the one or more engine cylinders that recirculate exhaust gas to the intake manifold and the remaining engine cylinders, and stopping fuel injection to the remaining engine cylinders further comprises: indicating that engine operation is not required; wherein engine operation being required comprises a request for vehicle cabin heat, or vehicle cabin air-conditioning. A sixth example of the method optionally includes any one or more or each of the first through fifth examples and further includes wherein responsive to an indication that engine operation is required during either light loads of the engine where the energy storage capacity of the energy storage device is greater than the predetermined amount, or a tip-out event: stopping fuel injection to the one or more engine cylinders that recirculate exhaust gas to the remaining engine cylinders such that the one or more engine cylinders that recirculate exhaust gas to the remaining cylinders are operated with air; operating the onboard energy storage device to increase engine speed to a predetermined threshold engine speed; and operating the onboard energy storage device to cancel torque pulsations resulting from an imbalance between torque produced from combusting and non-combusting cylinders; where cancelling torque pulsations includes supplying torque to a driveline of the vehicle, to provide a substantially similar level of torque as previous and/or subsequent combusting cylinders. A seventh example of the method optionally includes any one or more or each of the first through sixth examples and further comprises subsequent to spinning the engine to rest and responsive to an engine restart event: indicating whether the restart event comprises a cold start event, where a cold start event comprises an engine temperature or engine coolant temperature below a threshold temperature. An eighth example of the method optionally includes any one or more or each of the first through seventh examples and further includes wherein responsive to an indication that the engine restart event does not comprise a cold start event: concurrently starting fuel injection to both the remaining engine cylinders that do not recirculate exhaust gas to the intake manifold and to the one or more engine cylinders that recirculate exhaust gas to the intake manifold; and increasing engine torque to at least the engine output torque threshold, and recharging the energy storage device; where the energy storage capacity of the energy storage device is indicated to be less than the predetermined amount. A ninth example of the method optionally includes any one or more or each of the first through eighth examples and further includes wherein responsive to an indication that the engine restart event does not comprise a cold start event: activating the engine by starting fuel injection to the remaining engine cylinders that do not recirculate exhaust gas to the intake manifold, and not starting fuel injection to the one or more engine cylinders that recirculate exhaust gas to the intake manifold; monitoring an engine speed; and responsive to the engine speed reaching a threshold engine speed, where a rate of change in engine speed is further indicated to be less than a threshold rate of change: maintaining activated the remaining engine cylinders that do not recirculate exhaust gas to the intake manifold, and starting fuel injection to the one or more engine cylinders that recirculate exhaust gas to the intake manifold; where starting fuel injection to the one or more engine cylinders that recirculate exhaust gas to the intake manifold further comprises an indication of engine torque demand greater than the engine output torque threshold. A tenth example of the method optionally includes any one or more or each of the first through ninth examples and further includes wherein responsive to an indication that the engine restart event comprises a cold start event: activating the engine by starting fuel injection to the remaining engine cylinders that do not recirculate exhaust gas to the intake manifold, and not starting fuel injection to engine cylinders that recirculate exhaust gas to the intake manifold; monitoring an engine speed; and responsive to the engine speed reaching a threshold engine speed, where a rate of change in engine speed is further indicated to be less than a threshold rate of change, and where the energy storage capacity of the energy storage device is indicated to be less than the predetermined amount: increasing engine torque to at least the engine output torque threshold, recharging the onboard energy storage device; and starting fuel injection to engine cylinders that recirculate exhaust gas to the intake manifold. An eleventh example of the method optionally includes any one or more or each of the first through tenth examples and further comprises responsive to an indication that a desired engine torque is equal to or greater than the engine output torque threshold: maintaining activated the remaining engine cylinders that do not recirculate exhaust gas to the intake manifold and maintaining activated the engine cylinders that recirculate exhaust gas to the intake manifold; and operating the engine at the desired engine torque.

Another example of a method comprises recirculating exhaust gases from one or more cylinders of an engine to an intake manifold of the engine and to remaining cylinders without controlling an amount of the recirculated exhaust gases; controlling power output of the engine to a desired power to propel a motor vehicle driven by the engine at a desired speed; and when engine loads are less than a preselected load and when a charge state of an energy storage device is less than a predetermined amount, increasing the power beyond the desired power, and recharging the energy storage device to reduce the power to the desired power while maintaining the amount of recirculated exhaust gases, the energy storage device comprising one or more of a battery, a mechanical flywheel storage device, or a hydraulic pressure accumulator; and when engine loads are less than the preselected load and when charge state of the energy storage device is greater than the predetermined amount, propelling the vehicle at least in part by energy from the energy storage device. In a first example of the method, the method further comprises stopping fueling of at least the one or more engine cylinders that recirculate exhaust gas to the remaining cylinders when engine loads are less than the preselected load and when charge state of the energy storage device is greater than the predetermined amount. A second example of the method optionally includes the first example and further comprises ceasing the vehicle propulsion from the energy storage device and resuming fueling the one or more cylinders that recirculate exhaust gas to the remaining cylinders when the charge state of the energy storage device exceeds a predetermined value. A third example of the method optionally includes any one or more or each of the first and second examples and further includes wherein engine loads below the preselected load during recirculating exhaust gases from one or more cylinders of the engine to the remaining cylinders results in combustion instability; wherein the preselected load is greater than a tip-out event load by a predetermined amount, a tip-out event comprising one or more of braking of the vehicle, lifting off of a gas pedal of the vehicle, or a combination of braking and lifting off of the gas pedal; and wherein a tip-out event comprises shutting off at least the one or more cylinders that recirculate exhaust gas to the remaining cylinders and propelling the vehicle at least in part by energy from the energy storage device, independent of whether the charge state of the energy storage device is greater than, or less than, the predetermined amount. A fourth example of the method optionally includes any one or more or each of the first through third examples and further comprises indicating whether engine operation is required, wherein required engine operation comprises a request for vehicle cabin heat, or air-conditioning; under conditions wherein the charge state of the energy storage device is greater than the predetermined amount and engine load is below the preselected load but greater than a tip-out event, or responsive to a tip-out event independent of the charge state of the energy storage device; shutting off the one or more cylinders that recirculate exhaust gas to the remaining cylinders and shutting off the remaining cylinders, and propelling the vehicle wholly by energy from the energy storage device; where engine operation is not indicated to be required. A fifth example of the method optionally includes any one or more or each of the first through fourth examples and further comprises wherein engine operation is indicated to be required; and responsive to conditions wherein the charge state of the energy storage device is greater than the predetermined amount and engine load is below the preselected load but greater than a tip-out event, or responsive to a tip-out event independent of the charge state of the energy storage device: stopping fuel injection to the one or more engine cylinders that recirculate exhaust gas to the remaining engine cylinders such that the one or more engine cylinders that recirculate exhaust gas to the remaining cylinders are operated with air; operating the energy storage device to increase engine speed to a predetermined threshold engine speed; and operating the energy storage device to cancel torque pulsations resulting from an imbalance between torque produced from combusting and non-combusting cylinders; where cancelling torque pulsations includes supplying torque to a driveline of the vehicle, to provide a substantially similar level of torque as previous and/or subsequent combusting cylinders. A sixth example of the method optionally includes any one or more or each of the first through fifth examples and further includes wherein shutting off the one or more cylinders that recirculate exhaust gas to the remaining cylinders and shutting off the remaining cylinders, and propelling the vehicle wholly by energy from the energy storage device further comprises: operating the energy storage device to spin the engine unfueled to purge the intake manifold of residual exhaust and replenish the intake manifold with fresh intake air; where air supplied to the intake manifold is regulated by an intake throttle, and wherein the intake throttle is commanded open during spinning the engine unfueled; and responsive to an indication that residual exhaust in the intake manifold is below a threshold level: spinning the engine to rest via the energy storage device.

An example of a system for a hybrid vehicle comprises an engine including an intake and an exhaust; an energy storage device; vehicle wheels propelled using torque from one or more of the engine and energy from the energy storage device; a first set of one or more cylinders that route exhaust to an exhaust passage; a second set of one or more cylinders that route exhaust directly from the second set of cylinder(s) to an intake manifold of the engine; a controller, storing instructions in non-transitory memory, that when executed, cause the controller to: control power output of the engine to a desired power to propel the vehicle driven by the engine at a desired speed, and when engine loads are less than a preselected load and when a charge state of the energy storage device is less than a predetermined amount, increase the power beyond the desired power, and charge the energy storage device to reduce the power to the desired power; and when engine loads are less than the preselected load and when charge state of the energy storage device is greater than the predetermined amount, stop fueling at least the one or more cylinders that route exhaust gas to the intake manifold and propelling the vehicle at least in part by energy from the energy storage device; wherein the onboard energy storage device comprises one or more of a battery, a mechanical flywheel storage device, or a hydraulic pressure accumulator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   recirculating exhaust gases from a first set of one or more cylinders of an engine to a second set of remaining cylinders without controlling an amount of recirculated exhaust gases;
   controlling a power output of the engine to a desired power;
   under light loads of the engine, where light loads comprise a torque demand below an engine output torque threshold but greater than a tip-out event torque level, increasing the power output of the engine beyond the desired power, and recharging a battery to reduce the power output to the desired power while maintaining the amount of recirculated exhaust gases; and
   responsive to light loads of the engine or the tip-out event and a storage capacity of the battery greater than a predetermined amount, and further responsive to an indication that engine operation is requested, stopping fuel injection to the first set of one or more engine cylinders that recirculate exhaust gas to the second set of remaining cylinders, operating an electric motor to increase an engine speed to a predetermined threshold engine speed, and controlling the electric motor to cancel torque pulsations resulting from an imbalance between torque produced from the first set of one or more cylinders and torque produced from the second set of remaining cylinders, where cancelling torque pulsations includes supplying torque to a driveline of a vehicle, to provide a substantially similar level of torque between the first set of one or more cylinders and the second set of remaining cylinders.

2. The method of claim 1, wherein the desired power comprises a desired wheel power or a desired engine idle speed.

3. The method of claim 1, where recirculating exhaust gases under light loads of the engine from the first set of one or more cylinders of the engine to the second set of remaining cylinders without controlling the amount of the recirculated exhaust gases results in combustion instability; and
   wherein the engine output torque threshold is greater than the tip-out event torque level by a predetermined amount.

4. The method of claim 1,
   wherein the storage capacity of the battery greater than the predetermined amount comprises a level of storage capacity where the battery is unable to accept further energy storage.

5. The method of claim 1, further comprising:
   responsive to light loads of the engine or the tip-out event and the storage capacity of the battery greater than the predetermined amount, and further responsive to an indication that engine operation is not requested, stopping fuel injection to the first set of one or more cylinders that recirculate exhaust gas to the second set of remaining cylinders, and stopping fuel injection to the second set of remaining cylinders;
   operating the electric motor to spin the engine unfueled to purge an intake manifold of the engine of residual exhaust and replenish the intake manifold with fresh intake air;
   where air supplied to the intake manifold is regulated by an intake throttle, and wherein the intake throttle is commanded open during spinning the engine unfueled; and
   responsive to an indication that residual exhaust in the intake manifold is below a threshold level:
      spinning the engine to rest via the electric motor.

6. The method of claim 1,
   wherein engine operation being requested comprises a request for vehicle cabin heat or vehicle cabin air-conditioning.

7. The method of claim 5, further comprising, subsequent to spinning the engine to rest and responsive to an engine restart event:
   indicating whether the engine restart event comprises a cold start event, where a cold start event comprises an engine temperature or an engine coolant temperature below a threshold temperature.

8. The method of claim 7, further comprising, responsive to an indication that the engine restart event does not comprise the cold start event:
   concurrently starting fuel injection to both the second set of remaining cylinders and the first set of one or more engine cylinders; and
   increasing engine torque to at least the engine output torque threshold, and recharging the battery;
   where the storage capacity of the battery is indicated to be less than the predetermined amount at a time of the engine restart event that does not comprise the cold start event.

9. The method of claim 7, further comprising, responsive to an indication that the engine restart event does not comprise the cold start event:
   activating the engine by starting fuel injection to the second set of remaining cylinders, and not starting fuel injection to the first set of one or more cylinders;
   monitoring an engine speed; and
   responsive to the engine speed reaching a threshold engine speed, where a rate of change in engine speed is further indicated to be less than a threshold rate of change in engine speed:
      maintaining activated the second set of remaining cylinders, and starting fuel injection to the first set of one or more cylinders;
      where starting fuel injection to the first set of one or more cylinders further comprises an indication of the torque demand greater than the engine output torque threshold.

10. The method of claim 9, further comprising, responsive to an indication that the engine restart event comprises the cold start event:
   activating the engine by starting fuel injection to the second set of remaining cylinders, and not starting fuel injection to first set of one or more cylinders;
   monitoring the engine speed; and
   responsive to the engine speed reaching the threshold engine speed, where the rate of change in engine speed is further indicated to be less than the threshold rate of change in engine speed, and where the storage capacity of the battery is indicated to be less than the predetermined amount:
increasing engine torque to at least the engine output torque threshold, recharging the battery; and
starting fuel injection to the first set of one or more cylinders.

11. The method of claim 10, further comprising:
responsive to an indication that a desired engine torque is equal to or greater than the engine output torque threshold:
maintaining fuel injection to the second set of remaining cylinders and maintaining fuel injection to the first set of one or more cylinders; and
operating the engine at the desired engine torque.

12. A method comprising:
recirculating exhaust gases from a first set of one or more cylinders of an engine to an intake manifold of the engine and to a second set of remaining cylinders without controlling an amount of recirculated exhaust gases;
controlling a power output of the engine to a desired power to propel a motor vehicle driven by the engine at a desired speed;
when engine loads are less than a preselected load, the preselected load greater than a tip-out event load by a predetermined amount, and when a charge state of a battery is less than a predetermined amount, increasing the power output of the engine beyond the desired power, and recharging the battery to reduce the power output of the engine to the desired power while maintaining the amount of recirculated exhaust gases; and
when engine loads are less than the preselected load but greater than the tip-out event load, and when the charge state of the battery is greater than the predetermined amount, or responsive to the tip-out event independent of the charge state of the battery, stopping fuel injection to the first set of one or more cylinders that recirculate exhaust gases to the second set of remaining cylinders and stopping fuel injection to the second set of remaining cylinders responsive to engine operation not being requested, and alternatively, in response to engine operation being requested, stopping fuel injection to the first set of one or more cylinders that recirculate exhaust gases to the second set of remaining engine cylinders, operating an electric motor to increase engine speed to a predetermined threshold engine speed and operating the electric motor to cancel torque pulsations resulting from an imbalance between torque produced from the first set of one or more cylinders and torque produced from the second set of remaining cylinders.

13. The method of claim 12, further comprising in response to stopping fuel injection to the first set of one or more cylinders that recirculate exhaust gases to the second set of remaining cylinders and stopping fuel injection to the second set of remaining cylinders:
continuing to propel the motor vehicle via the electric motor powered via the battery.

14. The method of claim 13, further comprising ceasing propelling the motor vehicle via the electric motor and resuming fueling the first set of one or more cylinders that recirculate exhaust gases to the second set of remaining cylinders when the charge state of the battery falls below a threshold charge level.

15. The method of claim 12, wherein engine loads below the preselected load during recirculating exhaust gases from the first set of one or more cylinders of the engine to the second set of remaining cylinders results in combustion instability;
wherein a tip-out event comprises one or more of braking of the motor vehicle, lifting off of a gas pedal of the motor vehicle, or a combination of braking and lifting off of the gas pedal; and
wherein the tip-out event further comprises shutting off at least the first set of one or more cylinders that recirculate exhaust gases to the second set of remaining cylinders and continuing to propel the motor vehicle at least in part by energy from the battery, independent of whether the charge state of the battery is greater than, or less than, the predetermined amount.

16. The method of claim 15, where engine operation being requested further comprises:
a request for vehicle cabin heat or air-conditioning.

17. The method of claim 12, wherein stopping fuel injection to the first set of one or more cylinders that recirculate exhaust gases to the second set of remaining cylinders and stopping fuel injection to the second set of remaining cylinders further comprises:
operating the electric motor to spin the engine unfueled to purge the intake manifold of residual exhaust and replenish the intake manifold with fresh air;
where fresh air supplied to the intake manifold is regulated by an intake throttle, and wherein the intake throttle is commanded open during spinning the engine unfueled; and
responsive to an indication that residual exhaust in the intake manifold is below a threshold level:
spinning the engine to rest.

18. A hybrid vehicle system, comprising:
an engine including an intake manifold and an exhaust manifold;
a battery;
vehicle wheels propelled using torque from one or more of the engine and energy from the an electric motor powered via the battery;
a second set of one or more cylinders that route exhaust to the exhaust manifold;
a first set of one or more cylinders that route exhaust directly from the first set of one or more cylinder to the intake manifold;
a controller, storing instructions in non-transitory memory, that when executed, cause the controller to:
control power output of the engine to a desired power to propel a vehicle driven by the engine at a desired speed, and when engine loads are less than a preselected load and when a charge state of the battery is less than a predetermined amount, increase the power output of the engine beyond the desired power, and charge the battery to reduce the power output of the engine to the desired power;
when engine loads are less than the preselected load and when the charge state of the battery is greater than the predetermined amount, stop fueling the first set of one or more cylinders that route exhaust to the intake manifold such that the first set of one or more cylinders is operated with air; and
operate the electric motor to cancel torque pulsations resulting from an imbalance between torque produced from the first set of one or more cylinders and torque produced from the second set of one or more cylinders when fueling is stopped to the first set of one or more cylinders.

\* \* \* \* \*